(12) United States Patent
Yamamoto et al.

(10) Patent No.: US 11,760,183 B2
(45) Date of Patent: Sep. 19, 2023

(54) BATTERY MOUNTING SYSTEM FOR AN ELECTRIC VEHICLE

(71) Applicant: HONDA MOTOR CO., LTD., Tokyo (JP)

(72) Inventors: Wataru Yamamoto, Tokyo (JP); Chihiro Sakurada, Tokyo (JP); Ryo Fukuyama, Tokyo (JP); Yuki Matsushima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 17/488,740

(22) Filed: Sep. 29, 2021

(65) Prior Publication Data

US 2022/0097510 A1    Mar. 31, 2022

(30) Foreign Application Priority Data

Sep. 30, 2020 (JP) ................................ 2020-166247

(51) Int. Cl.
*B60K 1/02* (2006.01)
*B60K 1/04* (2019.01)
(Continued)

(52) U.S. Cl.
CPC .............. *B60K 1/04* (2013.01); *H01M 50/209* (2021.01); *H01M 50/249* (2021.01);
(Continued)

(58) Field of Classification Search
CPC .............. B60K 1/04; B60K 2001/0438; H01M 50/209; H01M 50/249; H01M 50/264; H01M 2220/20
See application file for complete search history.

(56) References Cited

U.S. PATENT DOCUMENTS 11,091,017 B2* 8/2021 Shin ....................... B60L 50/66
2009/0145676 A1 6/2009 Takasaki et al.
(Continued)

FOREIGN PATENT DOCUMENTS

CN 205202706 U 5/2016
CN 109216603 A 1/2019
(Continued)

OTHER PUBLICATIONS

Jul. 12, 2022, Japanese Office Action issued for related JP Application No. 2020-166247.
(Continued)

*Primary Examiner* — Jason D Shanske
*Assistant Examiner* — James J Triggs
(74) *Attorney, Agent, or Firm* — Paratus Law Group, PLLC

(57) ABSTRACT

A vehicle includes a drive battery unit including a battery unit case, a pair of left and right battery side frames, and a plurality of fixing members. The drive battery unit is fixed to the vehicle. The battery unit case includes a left side wall and a right side wall. One of the pair of left and right battery side frames is disposed on a left side of the left side wall of the battery unit case. Another of the pair of left and right battery side frames is disposed on a right side of the right side wall of the battery unit case. Each of the fixing members is fixed to the pair of left and right battery side frames, and a length of each of the fixing members in the front-rear direction is longer than a length thereof in the vehicle width direction.

5 Claims, 13 Drawing Sheets

(51) Int. Cl.
*H01M 50/249* (2021.01)
*H01M 50/264* (2021.01)
*H01M 50/209* (2021.01)

(52) U.S. Cl.
CPC ... *H01M 50/264* (2021.01); *B60K 2001/0438* (2013.01); *H01M 2220/20* (2013.01)

(56) References Cited

U.S. PATENT DOCUMENTS

| | | | |
|---|---|---|---|
| 2010/0307848 A1* | 12/2010 | Hashimoto | B60K 1/04 180/68.5 |
| 2013/0266840 A1* | 10/2013 | Fujii | H01M 10/613 429/120 |
| 2016/0257346 A1 | 9/2016 | Wu et al. | |
| 2019/0359048 A1 | 11/2019 | Tsuyuzaki et al. | |
| 2021/0175572 A1 | 6/2021 | He et al. | |
| 2021/0249725 A1 | 8/2021 | He et al. | |
| 2021/0359366 A1 | 11/2021 | Chen et al. | |
| 2022/0102787 A1 | 3/2022 | He et al. | |
| 2022/0118840 A1 | 4/2022 | He et al. | |
| 2022/0118841 A1 | 4/2022 | He et al. | |
| 2022/0123404 A1 | 4/2022 | He et al. | |
| 2022/0126666 A1 | 4/2022 | He et al. | |
| 2022/0126705 A1 | 4/2022 | He et al. | |

FOREIGN PATENT DOCUMENTS

| | | |
|---|---|---|
| CN | 110165113 A | 8/2019 |
| CN | 210467906 U | 5/2020 |
| JP | H10-138767 A | 5/1998 |
| JP | 2009-137408 A | 6/2009 |
| JP | 2013-103635 A | 5/2013 |
| JP | 2016-103491 A | 6/2016 |
| JP | 2017-226353 A | 12/2017 |
| JP | 2019-202745 A | 11/2019 |

OTHER PUBLICATIONS

Feb. 28, 2023, Translation of Chinese Office Action issued for related CN Application No. 202111156312.8.

* cited by examiner

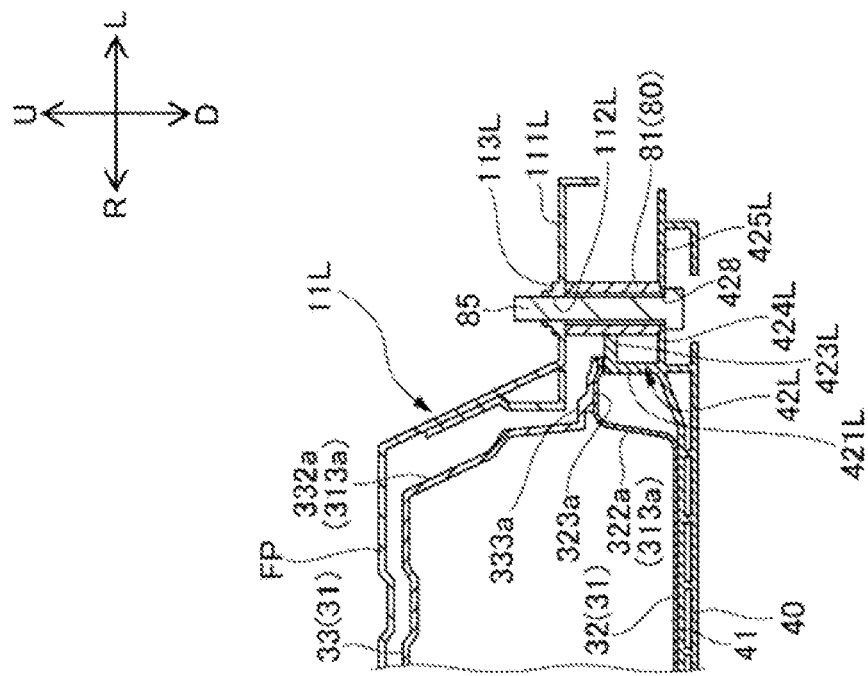
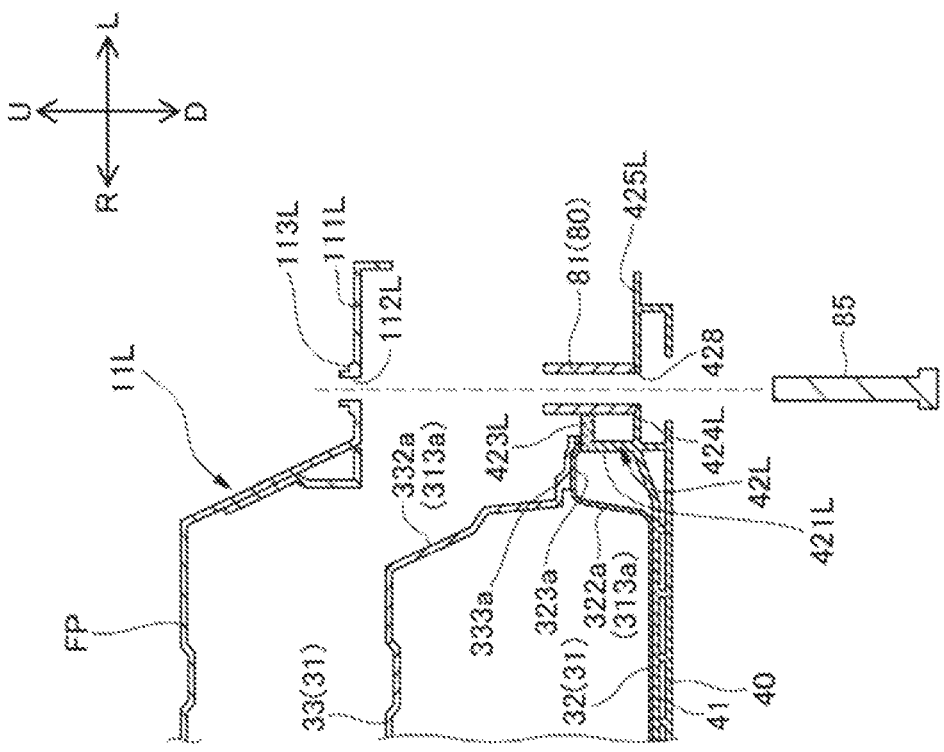

BATTERY MOUNTING SYSTEM FOR AN ELECTRIC VEHICLE

CROSS-REFERENCE TO RELATED APPLICATIONS

This application is based on and claims priority under 35 USC 119 from Japanese Patent Application No. 2020-166247 filed on Sep. 30, 2020.

TECHNICAL FIELD

The present disclosure relates to a vehicle, and more particularly to a vehicle including a drive battery unit.

BACKGROUND ART

In the related art, there has been known a vehicle, such as a hybrid vehicle or an electric vehicle, which is equipped with a drive battery unit and can be driven by electric power charged in the drive battery unit. For example, JP-A-2009-137408 discloses a vehicle in which a drive battery unit is disposed under a floor of the vehicle.

The vehicle disclosed in JP-A-2009-137408 includes a pair of left and right side members spaced apart from each other in a width direction of a vehicle body, and the drive battery unit disposed under the floor of the vehicle is fixed to the pair of left and right side members.

In recent years, in the vehicle which is equipped with the drive battery unit and can be driven by electric power charged in the drive battery unit, it is desired to extend a travelable range in which the vehicle is travelable by the electric power charged in the drive battery unit. As one of methods for extending the travelable range, there is a case where a volume of the drive battery unit is increased. When the volume of the drive battery unit disposed under the floor of the vehicle is increased, a dimension of the drive battery unit in a front-rear direction of the vehicle may increase.

However, in the vehicle disclosed in JP-A-2009-137408, since the drive battery unit is fixed to the pair of side members by a plurality of beam members protruding in a vehicle width direction from a battery case of the drive battery unit, when the dimension of the drive battery unit in the front-rear direction of the vehicle is increased, the drive battery unit may deflect downward between the beam members as viewed from a side, due to the own weight of the drive batten unit.

SUMMARY OF INVENTION

The present disclosure provides a vehicle in which a drive battery unit disposed under a floor panel can be prevented from deflecting downward due to its own weight as viewed from a side.

According to the present disclosure, there is a vehicle including a drive battery unit disposed under a floor panel in which the drive battery unit includes a battery unit case which accommodates a plurality of battery cells, a pair of left and right battery side frames which extends in a front-rear direction of the vehicle, and a plurality of fixing members through which fastening members are inserted, the drive battery unit is fixed to the vehicle by inserting the fastening members into the fixing members, the battery unit case includes a left side wall and a right side wall which face each other in a vehicle width direction and extend in the front-rear direction, one of the pair of left and right battery side frames is disposed on a left side of the left side wall of the battery unit case, another of the pair of left and right battery side frames is disposed on a right side of the right side wall of the battery unit case, and each of the fixing members is fixed to the pair of left and right battery side frames, and a length of each of the fixing members in the front-rear direction is longer than a length thereof in the vehicle width direction.

According to the present disclosure, since the drive battery unit is fixed to the vehicle by inserting the fastening members into the fixing members, the fixing members are fixed to the pair of left and right battery side frames, and the length of each of the fixing members in the front-rear direction is longer than the length thereof in the vehicle width direction, the rigidity of the drive battery unit with respect to the upper-lower direction is improved in the front-rear direction. As a result, the drive battery unit disposed under the floor panel can be prevented from deflecting downward due to its own weight as viewed from a side.

BRIEF DESCRIPTION OF DRAWINGS

FIGS. 13A and 13B are a sectional view of a main part of the drive battery unit of FIG. 3 and the periphery of the left side sill of the vehicle.

DESCRIPTION OF EMBODIMENTS

Figure 1:
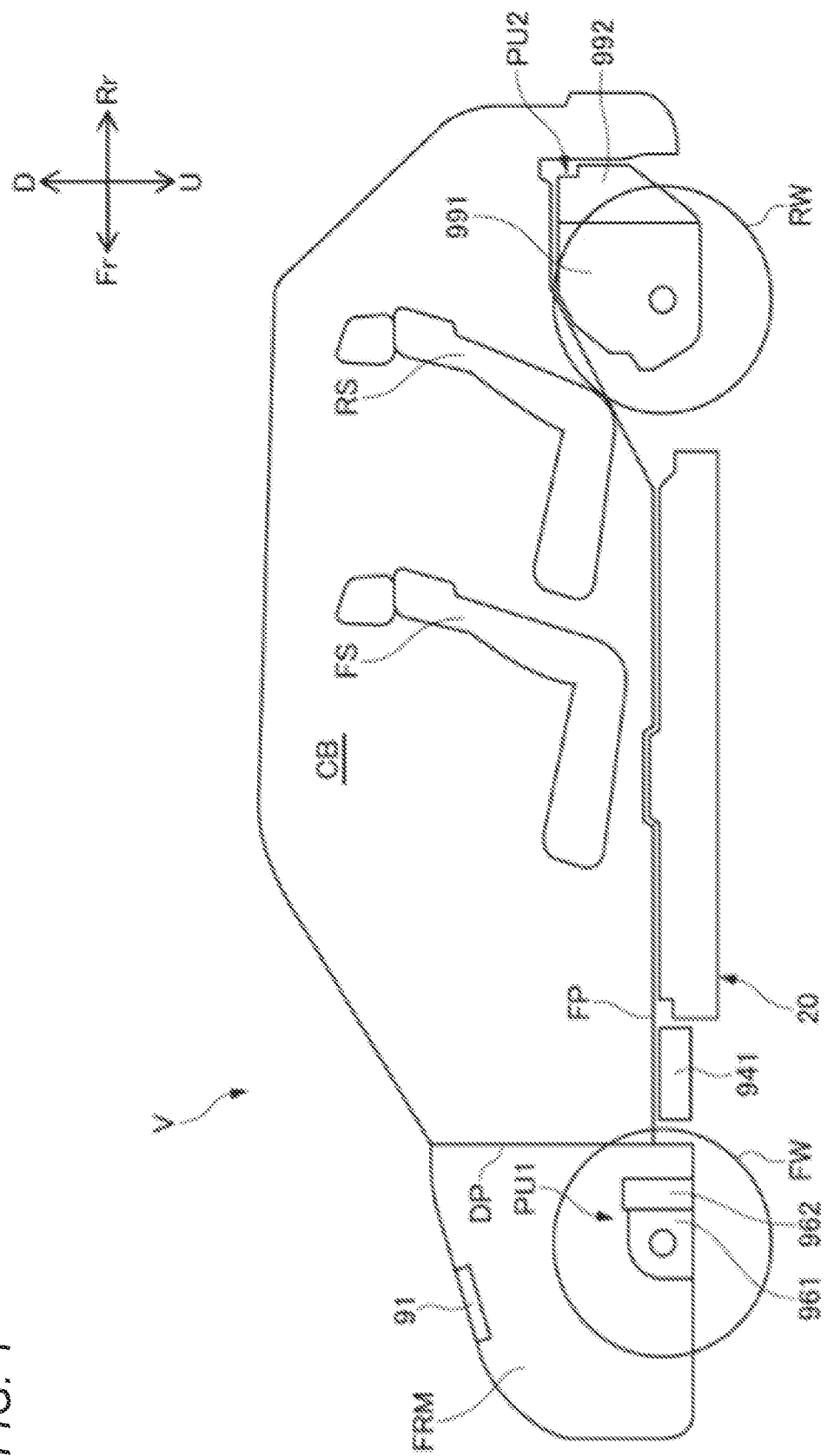
FIG. 1 is a side view of a vehicle according to an embodiment of the present disclosure.

Hereinafter, an embodiment of a vehicle according to the present disclosure will be described with reference to the accompanying drawings. Noted that the drawings are viewed in directions of reference numerals. In the present specification and the like, in order to simplify and clarify the description, a front-rear direction, a left-right direction, and an upper-lower direction are described in accordance with directions viewed from a driver of a vehicle. In the drawings, a front side of the vehicle is denoted by Fr, a rear side thereof is denoted by Rr, a left side thereof is denoted by L, a right side thereof is denoted by R, an upper side thereof is denoted by U, and a lower side thereof is denoted by D.

<Overall Configuration of Vehicle>

As illustrated in FIG. 1, a vehicle V according to the present embodiment includes a pair of left and right front wheels FW, a pair of left and right rear wheels RW, and a floor panel FP constituting a floor of the vehicle V. The vehicle V is partitioned into a cabin CB and a front room FRM in front of the cabin CB by a dash panel DP extending in the upper-lower direction above the floor panel FP. A front seat FS and a rear seat RS are provided in the cabin CB.

A drive battery unit 20 is disposed under the floor panel FP. The drive battery unit 20 is disposed under the floor panel FP and under a floor of the cabin CB.

The vehicle V includes a front wheel drive unit PU1 which drives the front wheels FW, and a rear wheel drive unit PU2 which drives the rear wheels RW. In the present embodiment, the front wheel drive unit PU1 is accommodated in the front room FRM, and the rear wheel drive unit PU2 is disposed behind the rear seat RS. The front wheel drive unit PU1 includes a drive rotary electric machine 961, a power control unit (PCU) 962 as a rotary electric machine control device which controls the drive rotary electric machine 961, and a power transmission mechanism (not illustrated) which transmits the power of the drive rotary electric machine 961 to the front wheels FW. The rear wheel drive unit PU2 includes a drive rotary electric machine 991, a PCU 992 as a rotary electric machine control device which controls the drive rotary electric machine 991, and a power transmission mechanism (not illustrated) which transmits the power of the drive rotary electric machine 991 to the rear wheels RW.

Figure 2:
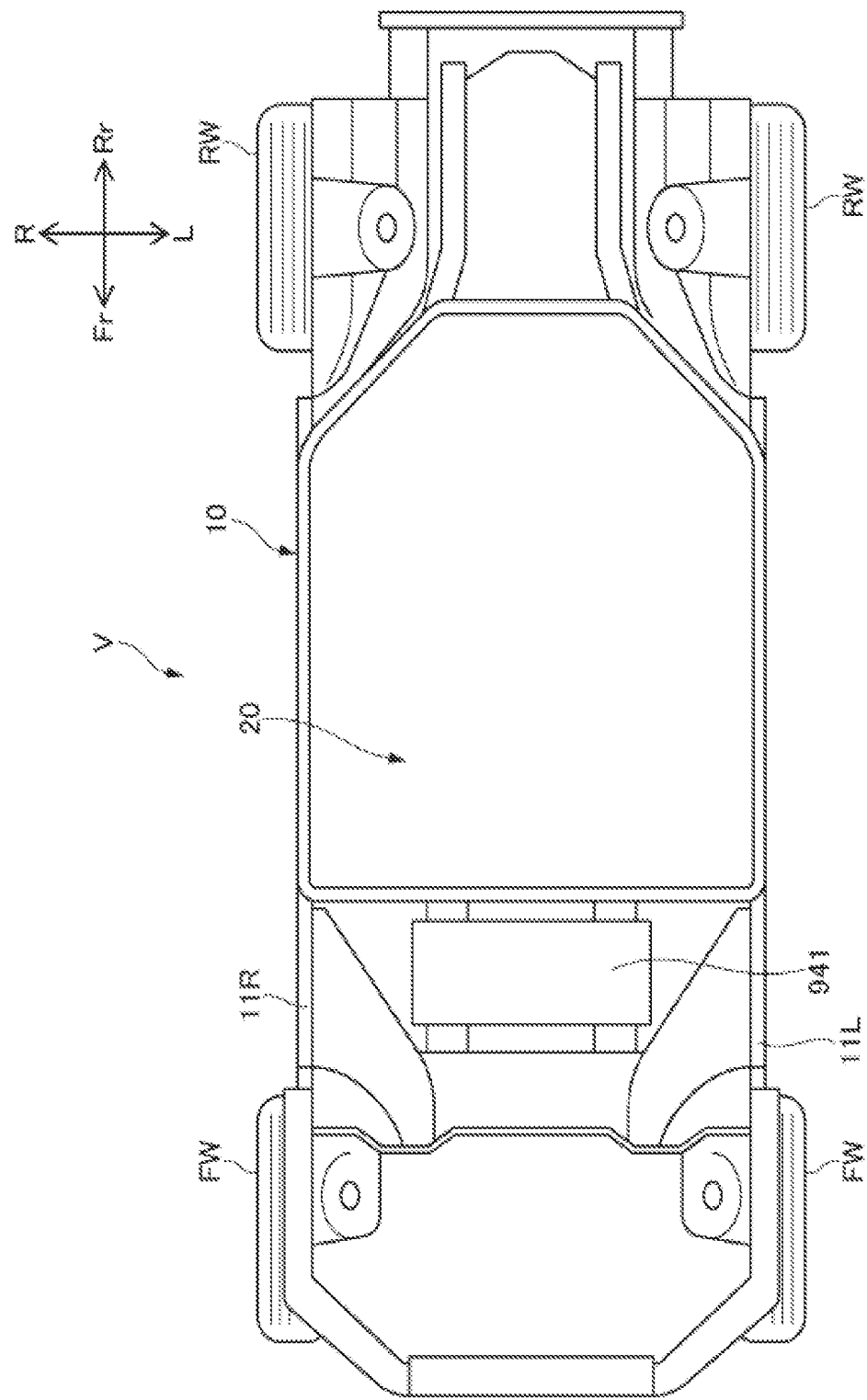
FIG. 2 is a bottom view of a main part of the vehicle of FIG. 1.

As illustrated in FIG. 2, the vehicle V includes a vehicle body frame 10 constituting a framework of a lower portion of the vehicle body. The vehicle body frame 10 includes a left side sill 11L and a right side sill 11R extending in the front-rear direction. The left side sill 11L and the right side sill 11R are disposed at predetermined intervals in a vehicle width direction from each other, and the left side sill 11L and the right side sill 11R are respectively disposed at a left end portion and the right end portion of the cabin CB in the vehicle width direction at a lower end of the cabin CB, and extend in the front-rear direction.

<Configuration of Drive Battery Unit>

Figure 3:
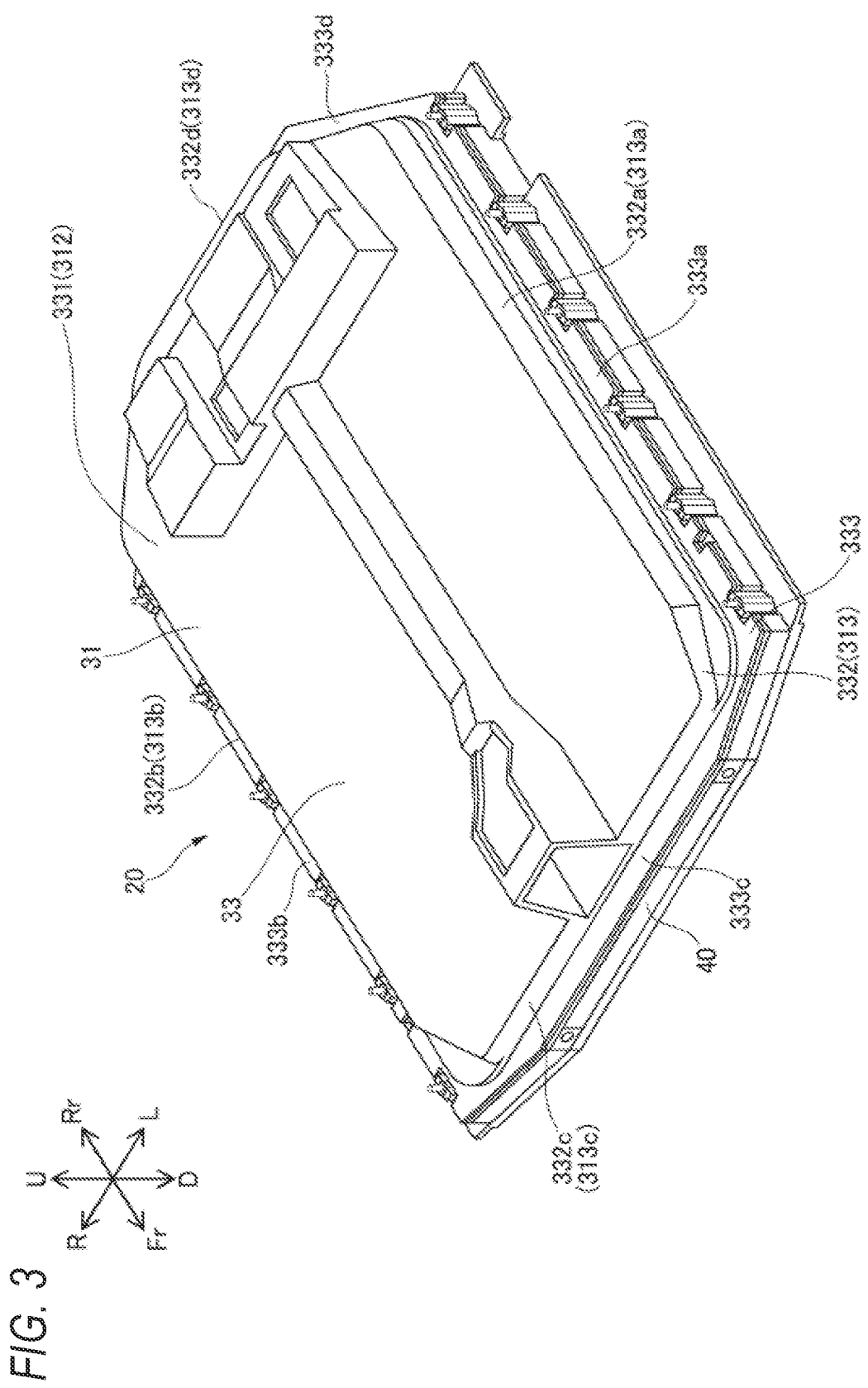
FIG. 3 is a perspective view of a drive battery unit of the vehicle of FIG. 1, as viewed obliquely from above.
Figure 4:
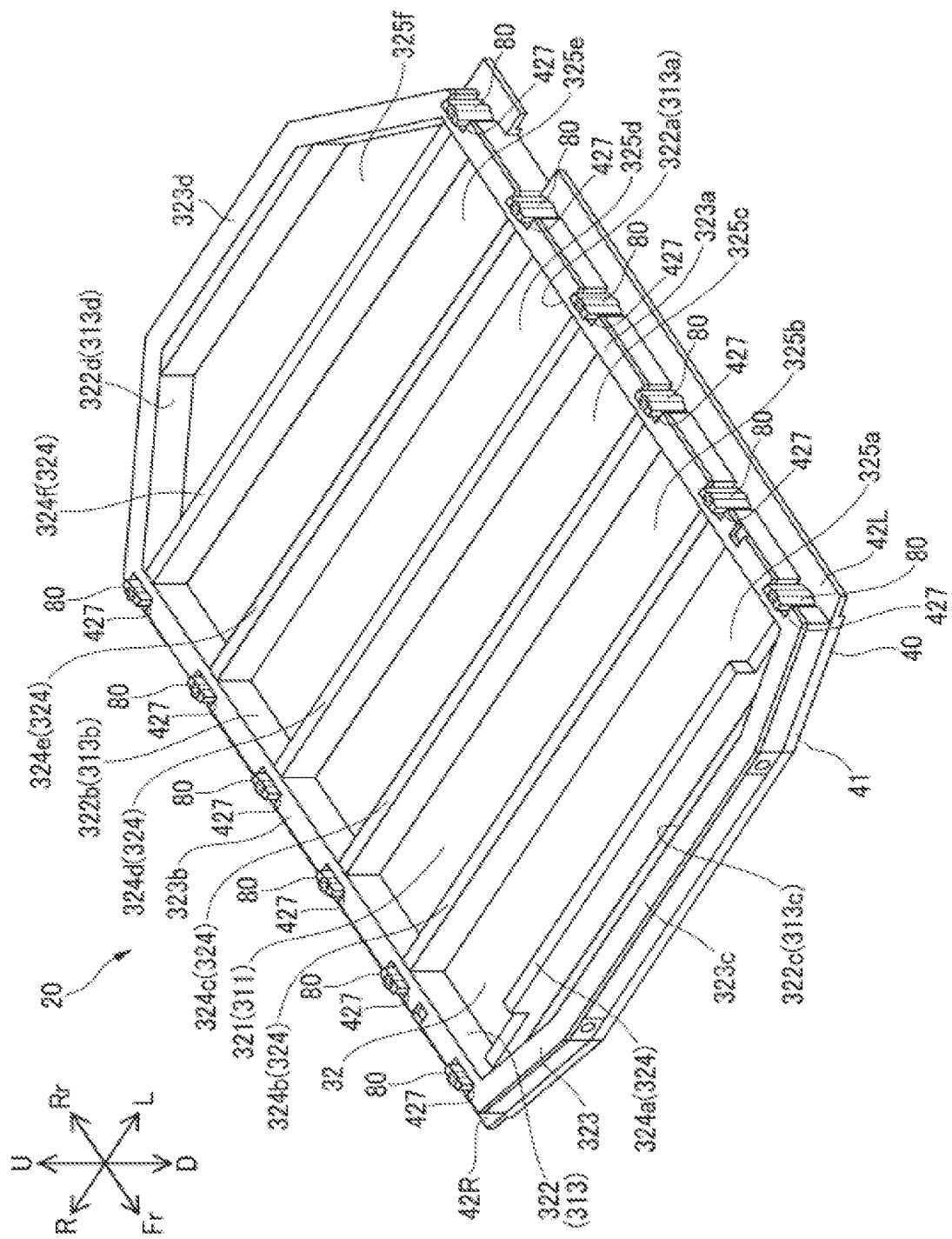
FIG. 4 is a perspective view of a battery tray and an under panel of the drive battery unit of FIG. 3, as viewed obliquely from above.
Figure 5:
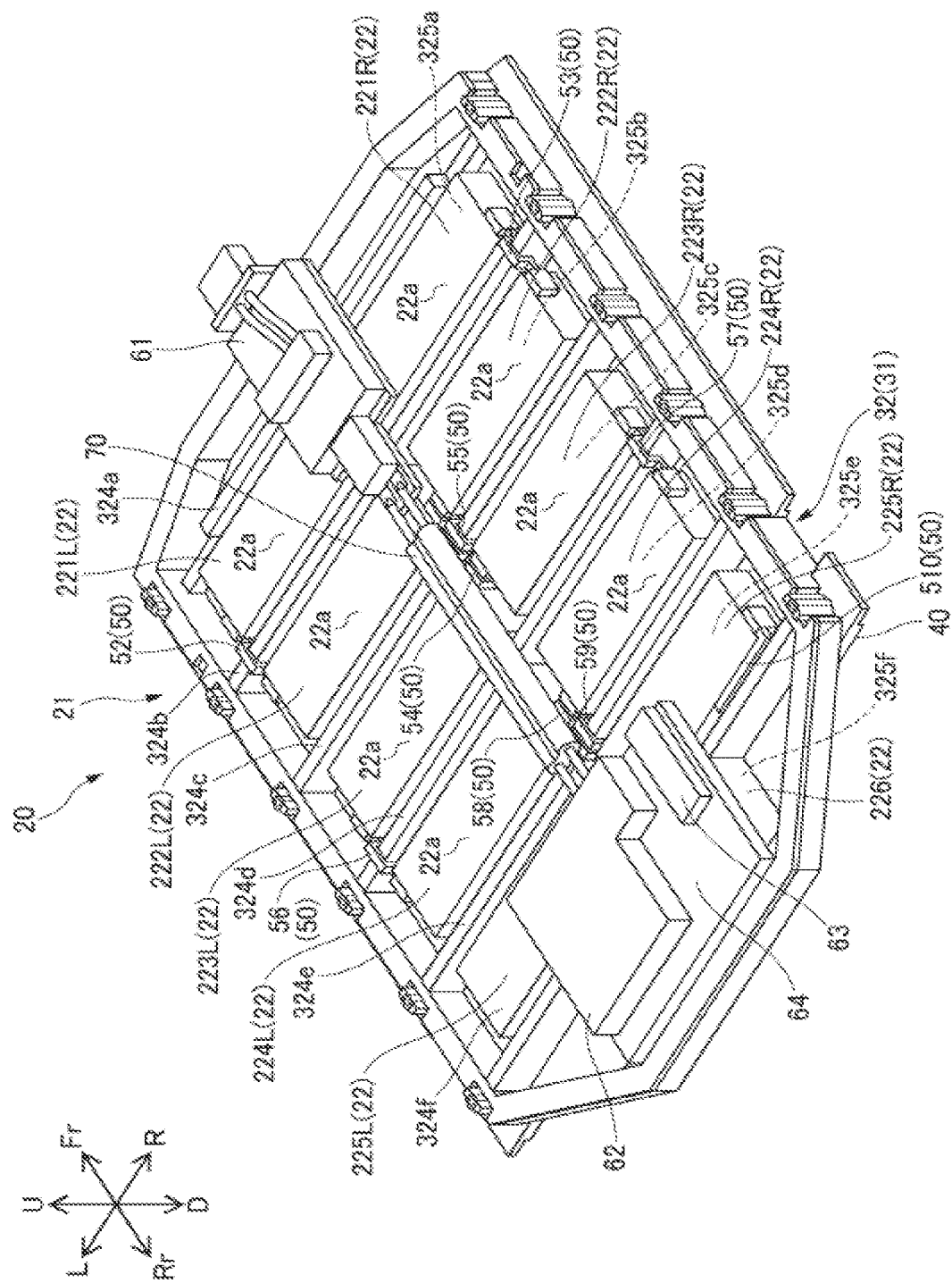
FIG. 5 is a perspective view of the drive battery unit of FIG. 3, as viewed obliquely from above in a state in which an upper cover is removed.

As illustrated in FIGS. 3 to 5, the drive battery unit 20 includes a battery pack 21 including a plurality of battery modules 22. In the present embodiment, the battery pack 21 includes eleven battery modules 22. Each battery module 22 includes a plurality of battery cells 23 (see FIG. 6) accommodated in a battery module case 22a. Each battery module 22 has a substantially rectangular parallelepiped shape in which the length in the vehicle width direction is longer than the length in the front-rear direction.

As illustrated in FIG. 3, the drive battery unit 20 includes a battery unit case 31 which accommodates the plurality of battery modules 22.

The battery unit case 31 includes a battery tray 32 (see FIG. 4) on which the battery module 22 is placed and which covers a bottom surface of the battery module 22, and an upper cover 33 which covers an upper surface of the battery module 22.

As illustrated in FIG. 4, the battery tray 32 includes a bottom portion 321 on which the battery module 22 is placed, and a side wall 322 which rises upward from a peripheral edge of the bottom portion 321 and surrounds a peripheral edge of the bottom portion 321. The side wall 322 includes a left side wall 322a which rises upward from a left edge of the bottom portion 321 and extends in the front-rear direction, a right side wall 322b which rises upward from a right edge of the bottom portion 321 and extends in the front-rear direction, a front side wall 322c which rises upward from a front edge of the bottom portion 321 and extends from a front end of the left side wall 322a to a front end of the right side wall 322b, and a rear side wall 322d which rises upward from a rear edge of the bottom portion 321 and extends from a rear end of the left side wall 322a to a rear end of the right side wall 322b.

A flange portion 323 which protrudes to an outer side of the battery tray 32 as viewed from above is formed at an upper end of the side wall 322. The flange portion 323 includes a left flange portion 323a which protrudes outward in the vehicle width direction, that is, leftward from the left side wall 322a, a right flange portion 323b which protrudes outward in the vehicle width direction, that is, rightward from the right side wall 322b, a front flange portion 323c which protrudes outward in the front-rear direction, that is, forward from the front side wall 322c, and a rear flange portion 323d which protrudes outward in the front-rear direction, that is, rearward from the rear side wall 322d.

The battery tray 32 includes a plurality of cross members 324 which protrude upward from the bottom portion 321 and extend substantially parallel to the vehicle width direction. In the present embodiment, six cross members 324a, 324b, 324c, 324d, 324e, and 324f are arranged in this order from the front in the front-rear direction.

In the present embodiment, the battery tray 32 includes a first space portion 325a which is surrounded by the bottom portion 321, the left side wall 322a, the right side wall 322b, and the cross members 324a, 324b and extends in the vehicle width direction, a second space portion 325b which is surrounded by the bottom portion 321, the left side wall 322a, the right side wall 322b, and the cross members 324b, 324c and extends in the vehicle width direction, a third space portion 325c which is surrounded by the bottom portion 321, the left side wall 322a, the right side wall 322b, and the cross members 324c, 324d and extends in the vehicle width direction, a fourth space portion 325d which is surrounded by the bottom portion 321, the left side wall 322a, the right side wall 322b, and the cross members 324d, 324e and extends in the vehicle width direction, a fifth space portion 325e which is surrounded by the bottom portion 321, the left side wall 322a, the right side wall 322b, and the cross members 324e, 324f and extends in the vehicle width direction, and a sixth space portion 325f which is surrounded by the bottom portion 321, the left side wall 322a, the right side wall 322b, the rear side wall 322d, and the cross member 324f and extends in the vehicle width direction.

The drive battery unit 20 further includes an under panel 40 which covers the battery tray 32 from below.

As illustrated in FIG. 5, in the present embodiment, two battery modules 22 arranged side by side in the vehicle width direction are arranged side by side in five rows in the front-rear direction in the battery unit case 31 of the drive battery unit 20. Further, one battery module 22 is disposed substantially at a center in the vehicle width direction behind the two battery modules 22 in a fifth row from the front arranged side by side in the vehicle width direction. That is, in the drive battery unit 20 according to the present embodiment, eleven battery modules 22 are accommodated in the battery unit case 31.

More specifically, in the first space portion 325a of the battery tray 32, two battery modules 221L, 221R are arranged side by side on the left side and the right side with the substantially center in the vehicle width direction interposed therebetween. Similarly, in the second space portion 325b of the battery tray 32, two battery modules 222L, 222R are arranged side by side on the left side and the right side with the substantially center in the vehicle width direction interposed therebetween. In the third space portion 325c of the battery tray 32, two battery modules 223L, 223R are arranged side by side on the left side and the right side with the substantially center in the vehicle width direction interposed therebetween. In the fourth space portion 325d of the battery tray 32, two battery modules 224L, 224R are arranged side by side on the left side and the right side with the substantially center in the vehicle width direction interposed therebetween. In the fifth space portion 325e of the battery tray 32, two battery modules 225L, 225R are arranged side by side on the left side and the right side with the substantially center in the vehicle width direction interposed therebetween. A battery module 226 is disposed substantially at the center of the sixth space portion 325f of the battery tray 32 in the vehicle width direction. In this way, the battery module 22 includes the battery modules 221L, 221R, 222L, 222R, 223L, 223R, 224L, 224R, 225L, 225R, and 226.

The drive battery unit 20 includes a plurality of bus bars 50 which electrically connects two adjacent battery modules 22. In the present embodiment, the plurality of bus bars 50 include a first bus bar 51 (see FIG. 6) which electrically connects the battery module 221L and the battery module 221R, a second bus bar 52 which electrically connects the battery module 221L and the battery module 222L, a third bus bar 53 which electrically connects the battery module 221R and the battery module 222R, a fourth bus bar 54 which electrically connects the battery module 222L and the battery module 223L, a fifth bus bar 55 which electrically connects the battery module 222R and the battery module 223R, a sixth bus bar 56 which electrically connects the battery module 223L and the battery module 224L, a seventh bus bar 57 which electrically connects the battery module 223R and the battery module 224R, an eighth bus bar 58 which electrically connects the battery module 224L and the battery module 225L, a ninth bus bar 59 which electrically connects the battery module 224R and the battery module 225R, and a tenth bus bar 510 which electrically connects the battery module 225R and the battery module 226.

The second bus bar 52 extends in the front-rear direction on the outside in the vehicle width direction of the battery module 221L and the battery module 222L, and electrically connects the battery module 221L and the battery module 222L.

The third bus bar 53 extends in the front-rear direction on the outside in the vehicle width direction of the battery module 221R and the battery module 222R, and electrically connects the battery module 221R and the battery module 222R.

The fourth bus bar 54 extends in the front-rear direction on the inside in the vehicle width direction of the battery module 222L and the battery module 223L, and electrically connects the battery module 222L and the battery module 223L.

The fifth bus bar 55 extends in the front-rear direction on the inside in the vehicle width direction of the battery module 222R and the battery module 223R and electrically connects the battery module 222R and the battery module 223R.

The sixth bus bar 56 extends in the front-rear direction on the outside in the vehicle width direction of the battery module 223L and the battery module 224L, and electrically connects the battery module 223L and the battery module 224L.

The seventh bus bar 57 extends in the front-rear direction on the outside in the vehicle width direction of the battery module 223R and the battery module 224R, and electrically connects the battery module 223R and the battery module 224R.

The eighth bus bar 58 extends in the front-rear direction on the inside in the vehicle width direction of the battery module 224L and the battery module 225L, and electrically connects the battery module 224L and the battery module 225L.

The ninth bus bar 59 extends in the front-rear direction on the inside in the vehicle width direction of the battery module 224R and the battery module 225R, and electrically connects the battery module 224R and the battery module 225R.

The drive battery unit 20 includes a first electrical connection box 61 which is disposed so as to straddle an upper portion of the first space portion 325a in the front-rear direction at substantially the center in the vehicle width direction and fixed to the front side wall 322c of the battery tray 32 and upper end surfaces of the cross members 324a, 324b. The drive battery unit 20 includes a second electrical connection box 62 which is disposed so as to straddle an upper portion of the sixth space portion 325f of the battery tray 32 in the front-rear direction and cover an upper portion of the battery module 226, and fixed to the rear side wall 322d of the battery tray 32 and an upper end surface of the cross member 324f.

A battery electronic control unit (ECU) 63 is electrically connected to the second electrical connection box 62. The battery ECU 63 is disposed adjacent to the second electrical connection box 62 in the vehicle width direction. In the present embodiment, the battery ECU 63 is disposed adjacent to a right side of the second electrical connection box 62. In the present embodiment, the second electrical connection box 62 and the battery ECU 63 are mounted on a common pedestal 64.

The drive battery unit 20 includes a center cable 70 which electrically connects the first electrical connection box 61 and the second electrical connection box 62 and is routed so as to extend in the front-rear direction at substantially the center in the vehicle width direction. The center cable 70 is routed so as to extend in the front-rear direction above substantially the center of the second space portion 325b, the third space portion 325c, the fourth space portion 325d, and the fifth space portion 325e in the vehicle width direction.

Returning to FIG. 3, the upper cover 33 includes an upper surface 331 which covers the battery module 22, the bus bar 50, the first electrical connection box 61, the second electrical connection box 62, the battery ECU 63, and the center cable 70 from above, and a side wall 332 which is bent downward from a peripheral edge of the upper surface 331 and surrounds the peripheral edge of the upper surface 331. The side wall 332 includes a left side wall 332a which is bent downward from a left edge of the upper surface 331 and extends in the front-rear direction, a right side wall 332b which is bent downward from a right edge of the upper surface 331 and extends in the front-rear direction, a front side wall 332c which is bent downward from a front edge of the upper surface 331 and extends from a front end of the left side wall 332a to a front end of the right side wall 332b, and a rear side wall 332d which is bent downward from a rear edge of the upper surface 331 and extends from a rear end of the left side wall 332a to a rear end of the right side wall 332b.

A flange portion 333 protruding to the outside of the upper cover 33 as viewed from above is formed at a lower end of the side wall 332. The flange portion 333 includes a left flange portion 333a which protrudes outward in the vehicle width direction, that is, leftward from the left side wall 332a, a right flange portion 333b which protrudes outward in the vehicle width direction, that is, rightward from the right side wall 332b, a front flange portion 333c which protrudes outward in the front-rear direction, that is, forward from the front side wall 332c, and a rear flange portion 333d which protrudes outward in the front-rear direction, that is, rearward from the rear side wall 332d.

The flange portion 323 of the battery tray 32 and the flange portion 333 of the upper cover 33 are arranged so as to overlap each other as viewed from above. Further, the upper cover 33 is fixed to the battery tray 32 by a fastening member such as a bolt at a position where the flange portion 323 of the battery tray 32 and the flange portion 333 of the upper cover 33 overlap each other as viewed from above.

In this manner, the battery unit case 31 accommodates the battery module 22, the bus bar 50, the first electrical connection box 61, the second electrical connection box 62, the battery ECU 63, and the center cable 70 therein. Further, a bottom surface 311 of the battery unit case 31 is constituted by the bottom portion 321 of the battery tray 32, an upper surface 312 of the battery unit case 31 is constituted by the upper surface 331 of the upper cover 33, and a side wall 313 which surrounds a peripheral edge of the bottom surface 311 and the upper surface 312 of the battery unit case 31 and extends in the upper-lower direction is constituted by the side wall 322 of the battery tray 32 and the side wall 332 of the upper cover 33. More specifically, a left side wall 313a extending in the upper-lower direction from left edges of the bottom surface 311 and the upper surface 312 of the battery unit case 31 is configured by the left side wall 322a of the battery tray 32 and the left side wall 332a of the upper cover 33, a right side wall 313b extending in the upper-lower direction from right edges of the bottom surface 311 and the upper surface 312 of the battery unit case 31 is configured by the right side wall 322b of the battery tray 32 and the right side wall 332b of the upper cover 33, a front side wall 313c extending in the upper-lower direction from front edges of the bottom surface 311 and the upper surface 312 of the battery unit case 31 is configured by the front side wall 322c of the battery tray 32 and the front side wall 332c of the upper cover 33, and a rear side wall 313d extending in the upper-lower direction from rear edges of the bottom surface 311 and the upper surface 312 of the battery unit case 31 is configured by the rear side wall 322d of the battery tray 32 and the rear side wall 332d of the upper cover 33.

<Circuit Configuration of Drive Battery Unit>

(Circuit Configuration of First Electrical Connection Box)

Figure 6:
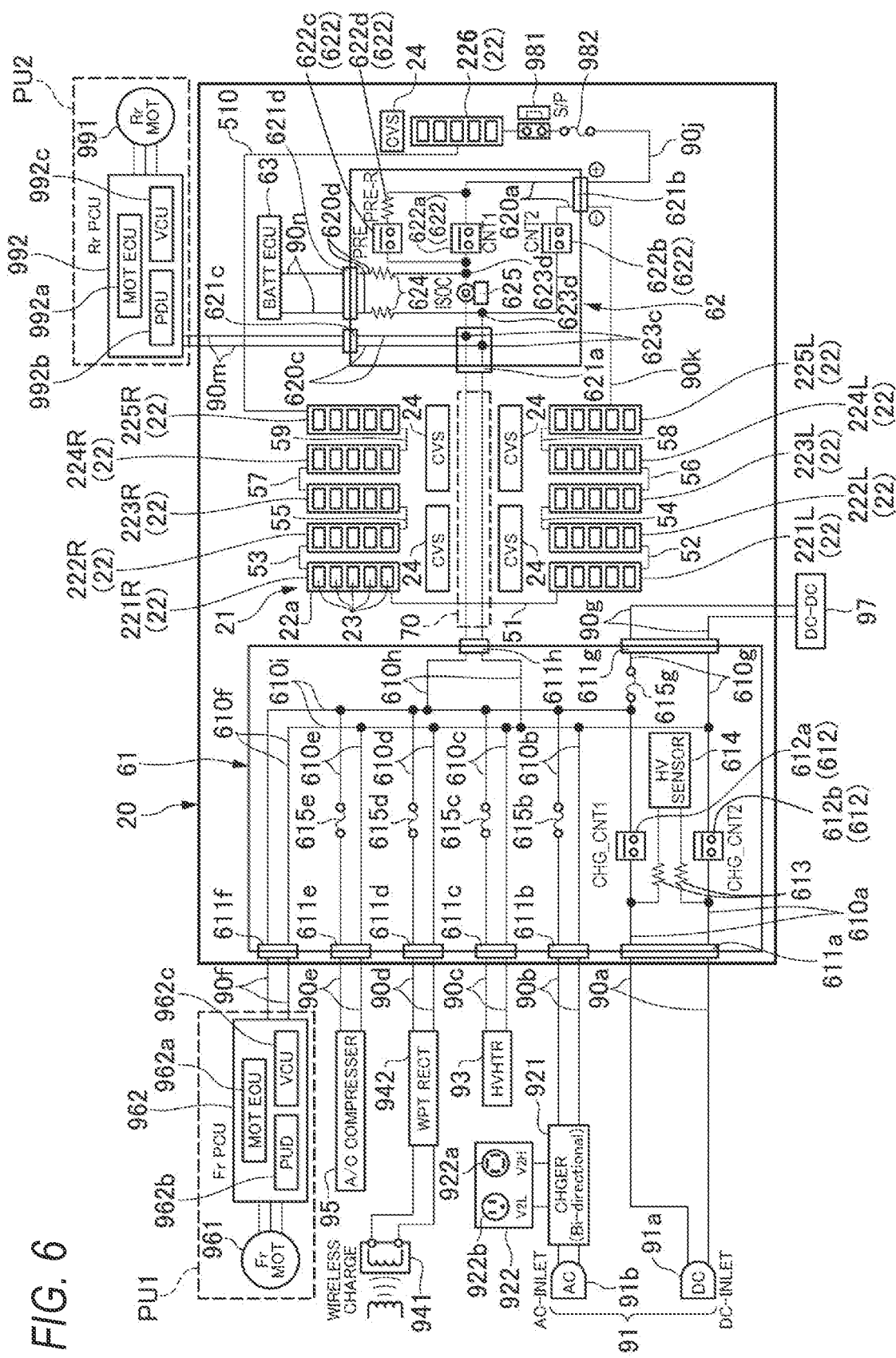
FIG. 6 is a circuit diagram of the drive battery unit in the vehicle of FIG. 1.

As illustrated in FIG. 6, the first electrical connection box 61 includes a power input circuit 610a for quick charging, a power input circuit 610b for normal charging, a power input/output circuit 610c for an AC heater, a power output circuit 610d for wireless charging, a power output circuit 610e for an AC compressor, a power input/output circuit 610f for a front wheel drive unit, a power input/output circuit 610g for a DC-DC converter, a power input/output circuit 610h for a center cable, and a power transmission circuit 610i. The power input circuit 610a for quick charging, the power input circuit 610b for normal charging, the power input/output circuit 610c for an AC heater, the power output circuit 610d for wireless charging, the power output circuit 610e for an AC compressor, the power input/output circuit 610f for a front wheel drive unit, the power input/output circuit 610g for a DC-DC converter, the power input/output circuit 610h for a center cable, and the power transmission circuit 610i are all circuits to which a direct current flows, and have two circuits of a positive-side circuit and a negative-side circuit. The positive-side circuits of the power input circuit 610a for quick charging, the power input circuit 610b for normal charging, the power input/output circuit 610c for an AC heater, the power output circuit 610d for wireless charging, the power output circuit 610e for an AC compressor, the power input/output circuit 610f for a front wheel drive unit, the power input/output circuit 610g for a DC-DC converter, and the power input/output circuit 610h for a center cable are all connected to the positive-side circuit of the power transmission circuit 610i. Similarly, the negative-side circuits of the power input circuit 610a for quick charging, the power input circuit 610b for normal charging, the power input/output circuit 610c for an AC heater, the power output circuit 610d for wireless charging, the power output circuit 610e for an AC compressor, the power input/output circuit 610f for a front wheel drive unit, the power input/output circuit 610g for a DC-DC converter, and the power input/output circuit 610h for a center cable are all connected to the negative-side circuit of the power transmission circuit 610i.

The first electrical connection box 61 includes a power line connector 611a for quick charging, a power line connector 611b for normal charging, a power line connector 611c for an AC heater, a power line connector 611d for wireless charging, a power line connector 611e for an AC compressor, a power line connector 611f for a front wheel drive unit, a power line connector 611g for a DC-DC converter, and a connector 611h for a center cable.

The power line connector 611a for quick charging is electrically connected to the power input circuit 610a for quick charging. The power line connector 611b for normal charging is electrically connected to the power input circuit 610b for normal charging. The power line connector 611c for an AC heater is electrically connected to the power input/output circuit 610c for an AC heater. The power line connector 611d for wireless charging is electrically connected to the power output circuit 610d for wireless charging. The power line connector 611e for an AC compressor is electrically connected to the power output circuit 610e for an AC compressor. The power line connector 611f for a front wheel drive unit is electrically connected to the power input/output circuit 610f for a front wheel drive unit. The power line connector 611g for a DC-DC converter is electrically connected to the power input/output circuit 610g for a DC-DC converter. The connector 611h for a center cable is electrically connected to the power input/output circuit 610h for a center cable.

The power input circuit 610a for quick charging is provided with a first switching element 612.

The first switching element 612 includes a positive-side main contactor 612a and a negative-side main contactor 612b. The positive-side main contactor 612a is a contactor provided in the positive-side circuit of the power input circuit 610a for quick charging. The negative-side main contactor 612b is a contactor provided in the negative-side circuit of the power input circuit 610a for quick charging. The positive-side main contactor 612a and the negative-side main contactor 612b of the first switching element 612 are electrical components for switching opening and closing of the power input circuit 610a for quick charging.

Between the power line connector 611*a* for quick charging and the first switching element 612, a voltage sensor 614 connected to the positive-side circuit and the negative-side circuit of the power input circuit 610*a* for quick charging via resistors 613 is provided.

The positive-side main contactor 612*a* and the negative-side main contactor 612*b* of the first switching element 612 and the voltage sensor 614 are all electrically connected to an MG-ECU (not illustrated) mounted on the vehicle V. The MG-ECU is a control unit which performs a drive control of the vehicle V. The opening and closing of the positive-side main contactor 612*a* and the negative-side main contactor 612*b* of the first switching element 612 are controlled by the MG-ECU. The voltage sensor 614 detects a potential difference between the positive-side circuit and the negative-side circuit of the power input circuit 610*a* for quick charging, and outputs a detection signal to the MG-ECU.

A circuit breaker 615*b* is provided in the positive-side circuit of the power input circuit 610*b* for normal charging. The circuit breaker 615*b* is an electrical component for interrupting the power input circuit 610*b* for normal charging when an abnormality occurs.

A circuit breaker 615*c* is provided in the positive-side circuit of the power input/output circuit 610*c* for an AC heater. The circuit breaker 615*c* is an electrical component for interrupting the power input/output circuit 610*c* for an AC heater when an abnormality occurs.

A circuit breaker 615*d* is provided in the positive-side circuit of the power output circuit 610*d* for wireless charging. The circuit breaker 615*d* is an electrical component for interrupting the power output circuit 610*d* for wireless charging when an abnormality occurs.

A circuit breaker 615*e* is provided in the positive-side circuit of the power output circuit 610*e* for an AC compressor. The circuit breaker 615*e* is an electrical component for interrupting the power output circuit 610*e* for an AC compressor when an abnormality occurs.

A circuit breaker 615*g* is provided in the positive-side circuit of the power input/output circuit 610*g* for a DC-DC converter. The circuit breaker 615*g* is an electrical component for interrupting the power input/output circuit 610*g* for a DC-DC converter when an abnormality occurs.

In the present embodiment, each of the circuit breakers 615*b*, 615*c*, 615*d*, 615*e*, and 615*g* is a fuse.

The power line connector 611*a* for quick charging of the first electrical connection box 61 is electrically connected to a receptacle 91*a* for quick charging of a power receiving unit 91 by a power line 90*a* for quick charging. One end of the power line 90*a* for quick charging is connected to the power line connector 611*a* for quick charging of the first electrical connection box 61, and the other end of the power line 90*a* for quick charging is connected to the receptacle 91*a* for quick charging of the power receiving unit 91. The receptacle 91*a* for quick charging of the power receiving unit 91 receives a direct current power from an external power supply at a higher voltage than the general household power.

The power line connector 611*b* for normal charging of the first electrical connection box 61 is electrically connected to a receptacle 91*b* for normal charging of the power receiving unit 91 via a charger 921 by a power line 90*b* for normal charging. One end of the power line 90*b* for normal charging is connected to the power line connector 611*b* for normal charging of the first electrical connection box 61, and the other end of the power line 90*b* for normal charging is connected to the receptacle 91*b* for normal charging of the power receiving unit 91. The receptacle 91*b* for normal charging of the power receiving unit 91 receives an alternating current power for general households from the external power supply. The charger 921 is provided between one end and the other end of the power line 90*b* for normal charging. A power supply unit 922 capable of outputting electric power is connected to the charger 921. The power supply unit 922 includes a receptacle 922*a* for a household power supply capable of supplying electric power to the household power supply, and a receptacle 922*b* for electrical equipment capable of supplying electric power to electrical equipment or the like. The charger 921 is a converter which converts the alternating current power received from the receptacle 91*b* for normal charging of the power receiving unit 91 into the direct current power to supply the direct current power to the drive battery unit 20, and converts the direct current power charged in the drive battery unit 20 into the alternating current power to supply the alternating current power from the power supply unit 922 to the household power supply, the electrical equipment, or the like.

The power line connector 611*c* for an AC heater of the first electrical connection box 61 is electrically connected to an AC heater 93 mounted on the vehicle V by a power line 90*c* for an AC heater. The AC heater 93 is a heater for generating warm air in an air conditioner mounted on the vehicle V.

The power line connector 611*d* for wireless charging of the first electrical connection box 61 is electrically connected to a wireless power receiving unit 941 mounted on the vehicle V via a rectifier 942 by a power line 90*d* for wireless charging. The wireless power receiving unit 941 is, for example, a coil for receiving electric power, and receives the alternating current power in a contactless manner by electromagnetic induction from a power transmission coil connected to the external power supply. The rectifier 942 is a rectifier which converts the alternating current power received by the wireless power receiving unit 941 into the direct current power to supply the direct current power to the drive battery unit 20.

The power line connector 611*e* for an AC compressor of the first electrical connection box 61 is electrically connected to an AC compressor 95 mounted on the vehicle V by a power line 90*e* for an AC compressor. The AC compressor 95 is a compressor of an air conditioner mounted on the vehicle V.

The power line connector 61*f* for a front wheel drive unit of the first electrical connection box 61 is electrically connected to a PCU 962 of the front wheel drive unit PU1 by a power line 90*f* for a front wheel drive unit. The PCU 962 is electrically connected to the drive rotary electric machine 961 which drives the front wheels FW of the vehicle V. The PCU 962 includes an MOT-ECU 962*a*, a power drive unit (PDU) 962*b*, and a voltage control unit (VCU) 962*c*. The MOT-ECU 962*a* is electrically connected to the MG-ECU described above. The MG-ECU outputs a signal to the MOT-ECU 962*a*, and inputs a signal from the MOT-ECU 962*a*. The MOT-ECU 962*a* controls the PDU 962*b* based on a signal output from the MG-ECU. The VCU 962*c* is, for example, a DC-DC converter, boosts electric power input from the drive battery unit 20, and steps down electric power to be output to the drive battery unit 20. The PDU 962*b* is, for example, an inverter, converts the direct current power boosted by the VCU 962*c* into three-phase alternating current power to output the three-phase alternating current power to the drive rotary electric machine 961, and converts the three-phase alternating current power generated by the drive rotary electric machine 961 into the direct current power to output the direct current power to the VCU 962*c*. The MOT-ECU 962*a* and the PDU 962*c* are electrically connected to each other, the MOT-ECU 962a outputs a control signal to the PDU 962c, and the PDU 962c is driven based on a control signal output from the MOT-ECU 962a.

The power line connector 611g for a DC-DC converter of the first electrical connection box 61 is electrically connected to a DC-DC converter 97 mounted on the vehicle V by a power line 90g for a DC-DC converter. The DC-DC converter 97 is a buck-boost converter which boosts the electric power from the external power supply received from the receptacle 91a for quick charging, the receptacle 91b for normal charging, and the wireless power receiving unit 941, and steps down the electric power output from the drive battery unit 20.

A front end of the center cable 70 is connected to the connector 611h for a center cable of the first electrical connection box 61.

(Circuit Configuration of Second Electrical Connection Box)

The second electrical connection box 62 includes a battery power input/output circuit 620a, a power input/output circuit 620c for a rear wheel drive unit, and a power input circuit 620d for a battery ECU. Each of the battery power input/output circuit 620a, the power input/output circuit 620c for a rear wheel drive unit, and the power input circuit 620d for a battery ECU is a circuit to which a direct current flows, and includes two circuits of a positive-side circuit and a negative-side circuit.

The second electrical connection box 62 includes a connector 621a for a center cable, a connector 621b for battery pack connection, a power line connector 621c for a rear wheel drive unit, and a power line connector 621d for a battery ECU.

One end of the battery power input/output circuit 620a is connected to the connector 621a for a center cable, and the other end of the battery power input/output circuit 620a is connected to the connector 621b for battery pack connection.

The battery power input/output circuit 620a is provided with a second switching element 622.

The second switching element 622 includes a positive-side main contactor 622a and a negative-side main contactor 622b. The positive-side main contactor 622a is a contactor provided in the positive-side circuit of the battery power input/output circuit 620a. The negative-side main contactor 622b is a contactor provided in the negative-side circuit of the battery power input/output circuit 620a. The positive-side main contactor 622a and the negative-side main contactor 622b of the second switching element 622 are electrical components for switching opening and closing of the battery power input/output circuit 620a.

A precharge contactor 622c and a precharge resistor 622d are connected in parallel to the positive-side main contactor 622a. The precharge contactor 622c is a contactor connected in parallel with the positive-side main contactor 622a The precharge resistor 622d is a resistor connected in series to the precharge contactor 622c. The precharge contactor 622c and the precharge resistor 622d are electrical components for energizing a precharge path prior to the positive-side main contactor 622a in order to avoid an excessive inrush current to the battery pack 21.

One end of the power input/output circuit 620c for a rear wheel drive unit is connected to the power line connector 621c for a rear wheel drive unit, and the other end of the power input/output circuit 620c for a rear wheel drive unit is connected to the battery power input/output circuit 620a. A connection point 623c between the power input/output circuit 620c for a rear wheel drive unit and the battery power input/output circuit 620a is located between the connector 621a for a center cable and the second switching element 622 of the battery power input/output circuit 620a.

One end of the power input circuit 620d for a battery ECU is connected to the power line connector 621d for a battery ECU, and the other end of the power input circuit 620d for a battery ECU is connected to the battery power input/output circuit 620a. A connection point 623d between the power input circuit 620d for a battery ECU and the battery power input/output circuit 620a is located between the connection point 623c of the power input/output circuit 620c for a rear wheel drive unit and the second switching element 622. A resistor 624 is provided in each of the positive-side circuit and the negative-side circuit of the power input circuit 620d for a battery ECU.

The positive-side circuit of the battery power input/output circuit 620a is provided with a current sensor 625 between the connection point 623c of the power input/output circuit 620c for a rear wheel drive unit and the connection point 623d of the power input circuit 620d for a battery ECU. The current sensor 625 is connected to the MG-ECU described above, detects a current value flowing through the positive-side circuit of the battery power input/output circuit 620a, and outputs a detection signal to the MG-ECU. The MG-ECU estimates a state of charge (SOC) of the battery pack 21 based on the detection signal output from the current sensor 625.

The connector 621a for a center cable of the second electrical connection box 62 is connected to a rear end of the center cable 70.

Battery power lines 90j, 90k of the battery pack 21 are connected to the connector 621b for battery pack connection of the second electrical connection box 62. One end of each of the battery power lines 90j, 90k is connected to the connector 621b for battery pack connection, and the other end of each of the battery power lines 90j, 90k is connected to the battery module 22 of the battery pack 21. One end of the battery power line 90j is electrically connected to the positive-side circuit of the battery power input/output circuit 620a of the second electrical connection box 62 via the connector 621b for battery pack connection, and the other end of the battery power line 90j is connected to a positive-side terminal of the battery module 226 of the battery pack 21. One end of the battery power line 90k is electrically connected to the negative-side circuit of the battery power input/output circuit 620a of the second electrical connection box 62 via the connector 621b for battery pack connection, and the other end of the battery power line 90k is connected to a negative-side terminal of the battery module 225L of the battery pack 21. The battery power line 90j is provided with a service plug 981 and a circuit breaker 982. The service plug 981 is a component which interrupts energization of the battery pack 21 by, for example, a manual operation at the time of maintenance and inspection of the drive battery unit 20. The circuit breaker 982 is an electric component for interrupting the energization of the battery pack 21 when an abnormality occurs.

The power line connector 621c for a rear wheel drive unit of the second electrical connection box 62 is electrically connected to a PCU 992 of the rear wheel drive unit PU2 by a power line 90m for a rear wheel drive unit. The PCU 992 is electrically connected to the drive rotary electric machine 991 which drives the rear wheels RW of the vehicle V. The PCU 992 includes an MOT-ECU 992a, a power dive unit (PDU) 992b, and a voltage control unit (VCU) 992c. The MOT-ECU 992a is electrically connected to the MG-ECU described above. The MG-ECU outputs a signal to the MOT-ECU 992a, and inputs a signal from the MOT-ECU 992a. The MOT-ECU 992a controls the PDU 992b based on a signal output from the MG-ECU. The VCU 992c is, for example, a DC-DC converter, boosts electric power input from the drive battery unit 20, and steps down electric power to be output to the drive battery unit 20. The PDU 992b is, for example, an inverter, converts the direct current power boosted by the VCU 992c into three-phase alternating current power to output the three-phase alternating current power to the drive rotary electric machine 991, and converts the three-phase alternating current power generated by the drive rotary electric machine 991 into the direct current power to output the direct current power to the VCU 992c. The MOT-ECU 992a and the PDU 992c are electrically connected to each other, the MOT-ECU 992a outputs a control signal to the PDU 992c, and the PDU 992c is driven based on a control signal output from the MOT-ECU 992a.

The power line connector 621d for a battery ECU of the second electrical connection box 62 is electrically connected to the battery ECU 63 by a power line 90n for a battery ECU. The battery ECU 63 is connected to the MG-ECU described above. The MG-ECU outputs a signal to the battery ECU 63, and inputs a signal from the battery ECU 63. The battery ECU 63 outputs a control signal to the second electrical connection box 62 via the power line 90n for a battery ECU based on a signal output from the MG-ECU, and controls opening and closing of the positive-side main contactor 622a, the negative-side main contactor 622b, and the pre-charge contactor 622c of the second switching element 622.

(Circuit Configuration of Battery Pack)

In the battery pack 21, the positive-side terminal of the battery module 226 is connected to the battery power line 90j. A negative-side terminal of the battery module 226 and a positive-side terminal of the battery module 225R are electrically connected by the tenth bus bar 510. A negative-side terminal of the battery module 225R and a positive-side terminal of the battery module 224R are electrically connected by the ninth bus bar 59. A negative-side terminal of the battery module 224R and a positive-side terminal of the battery module 223R are electrically connected by the seventh bus bar 57. A negative-side terminal of the battery module 223R and a positive-side terminal of the battery module 222R are electrically connected by the fifth bus bar 55. A negative-side terminal of the battery module 222R and a positive-side terminal of the battery module 221R are electrically connected by the third bus bar 53. A negative-side terminal of the battery module 221R and a positive-side terminal of the battery module 221L are electrically connected by the first bus bar 51. A negative-side terminal of the battery module 221L and a positive-side terminal of the battery module 222L are electrically connected by the second bus bar 52. A negative-side terminal of the battery module 222L and a positive-side terminal of the battery module 223L are electrically connected by the fourth bus bar 54. A negative-side terminal of the battery module 223L and a positive-side terminal of the battery module 224L are electrically connected by the sixth bus bar 56. A negative-side terminal of the battery module 224L and a positive-side terminal of the battery module 225L are electrically connected by the eighth bus bar 58. The negative-side terminal of the battery module 225L is connected to the battery power line 90k.

In this manner, the battery pack 21 is connected in series in an order of the battery module 226, the battery module 225R, the battery module 224R, the battery module 223R, the battery module 222R, the battery module 221R, the battery module 221L, the battery module 222L, the battery module 223L, the battery module 224L, and the battery module 225L from the positive-side circuit of the battery power input/output circuit 620a, and is connected to the negative-side circuit of the battery power input/output circuit 620a.

The battery pack 21 is provided with a plurality of (five in the present embodiment) cell voltage sensors 24. Each cell voltage sensor 24 is electrically connected to the MG-ECU described above. Each cell voltage sensor 24 detects an output voltage value of each battery cell 23 accommodated in the battery module 22, and outputs a detection signal of the output voltage value of each battery cell 23 to the MG-ECU described above.

As described above, in the battery unit 20, the first electrical connection box 61 is connected to the front wheel drive unit PU1 which drives the front wheel FW of the vehicle V, and the second electrical connection box 62 is connected to the rear wheel drive unit PU2 which drives the rear wheel RW of the vehicle V. Therefore, both the front wheel FW and the rear wheel RW of the vehicle V can be driven by the electric power charged in the battery unit 20. Furthermore, since the first electrical connection box 61 is electrically connected to the power receiving unit 91 and the wireless power receiving unit 941 by the power line 90a for quick charging, the power line 90b for normal charging, and the power line 90d for wireless charging, the electric power of the external power supply can be charged in the battery unit 20.

<Fixing Structure of Drive Battery Unit>

As illustrated in FIG. 4, the under panel 40 includes a panel portion 41 which extends in the front-rear direction and the vehicle width direction and covers the battery tray 32 from below, and a left battery side frame 42L and a right battery side frame 42R which protrude upward from the panel portion 41 and extend in the front-rear direction at a left end portion and a right end portion of the panel portion 41 in the vehicle width direction. The left battery side frame 42L is disposed on an outer side in the vehicle width direction of the left side wall 322a of the battery tray 32, that is, on the left side. The right battery side frame 42R is disposed on an outer side in the vehicle width direction of the right side wall 322b of the battery tray 32, that is, on the right side. The under panel 40 including the left battery side frame 42L and the right battery side frame 42R is formed by extrusion molding along the front-rear direction.

The left battery side frame 42L and the right battery side frame 42R have a left-right symmetrical configuration. In the present specification, the configuration of the left battery side frame 42L will be described in detail, and a detailed description of the configuration of the right battery side frame 42R will be omitted.

Figure 7:
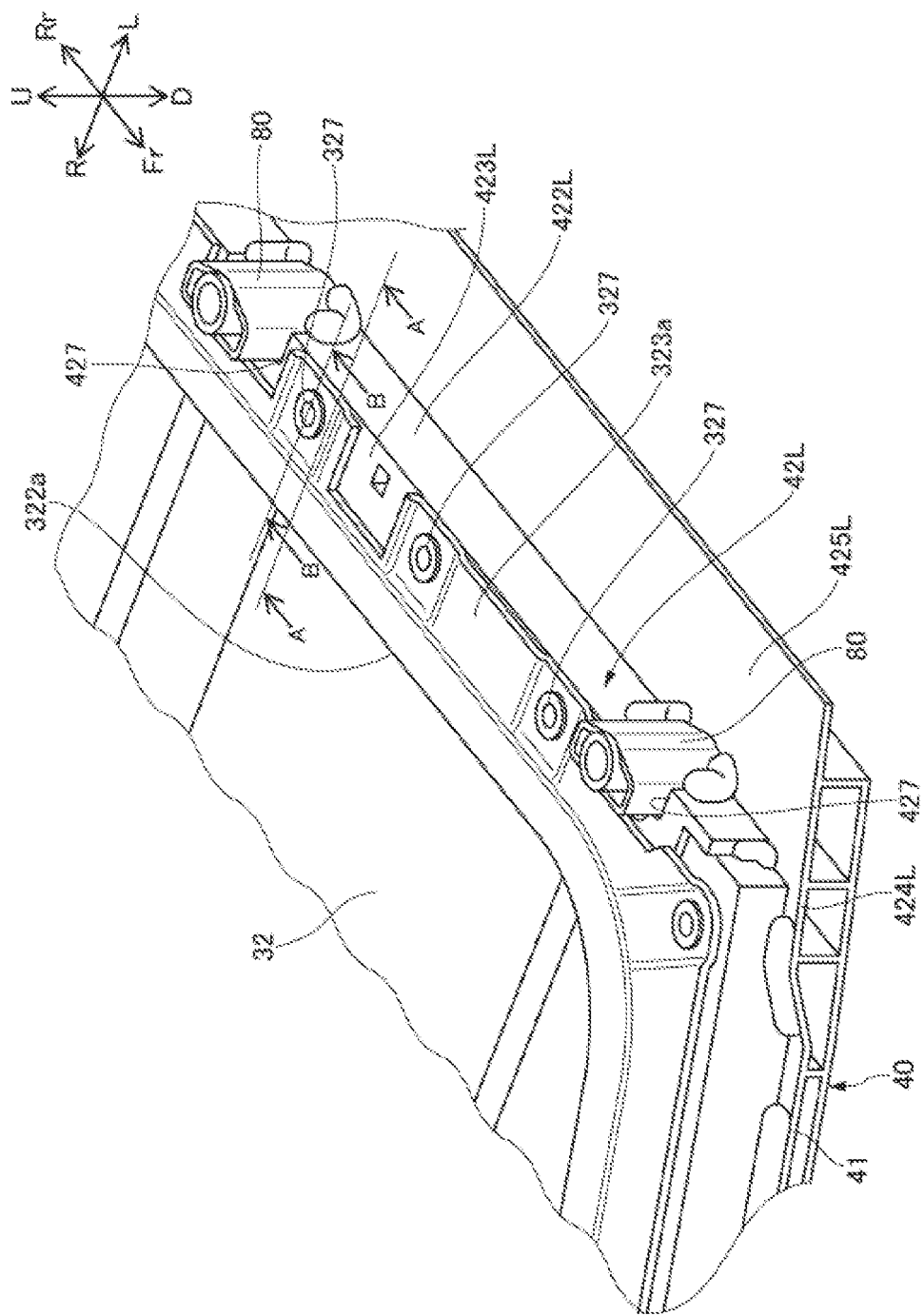
FIG. 7 is an enlarged view of a main part around a left battery side frame of FIG. 4.
Figure 8:
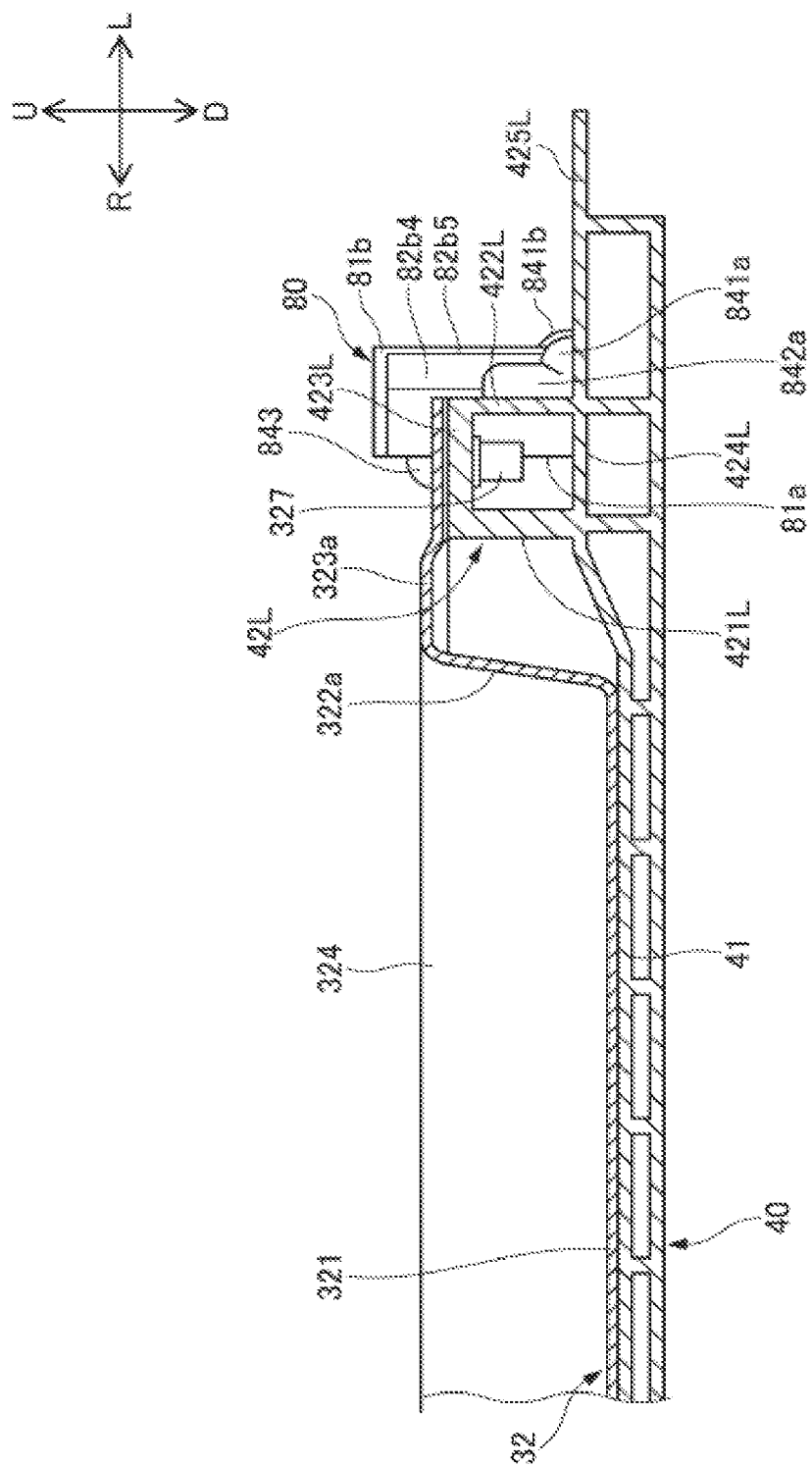
FIG. 8 is a sectional view taken along a line A-A of FIG. 7.
Figure 9:
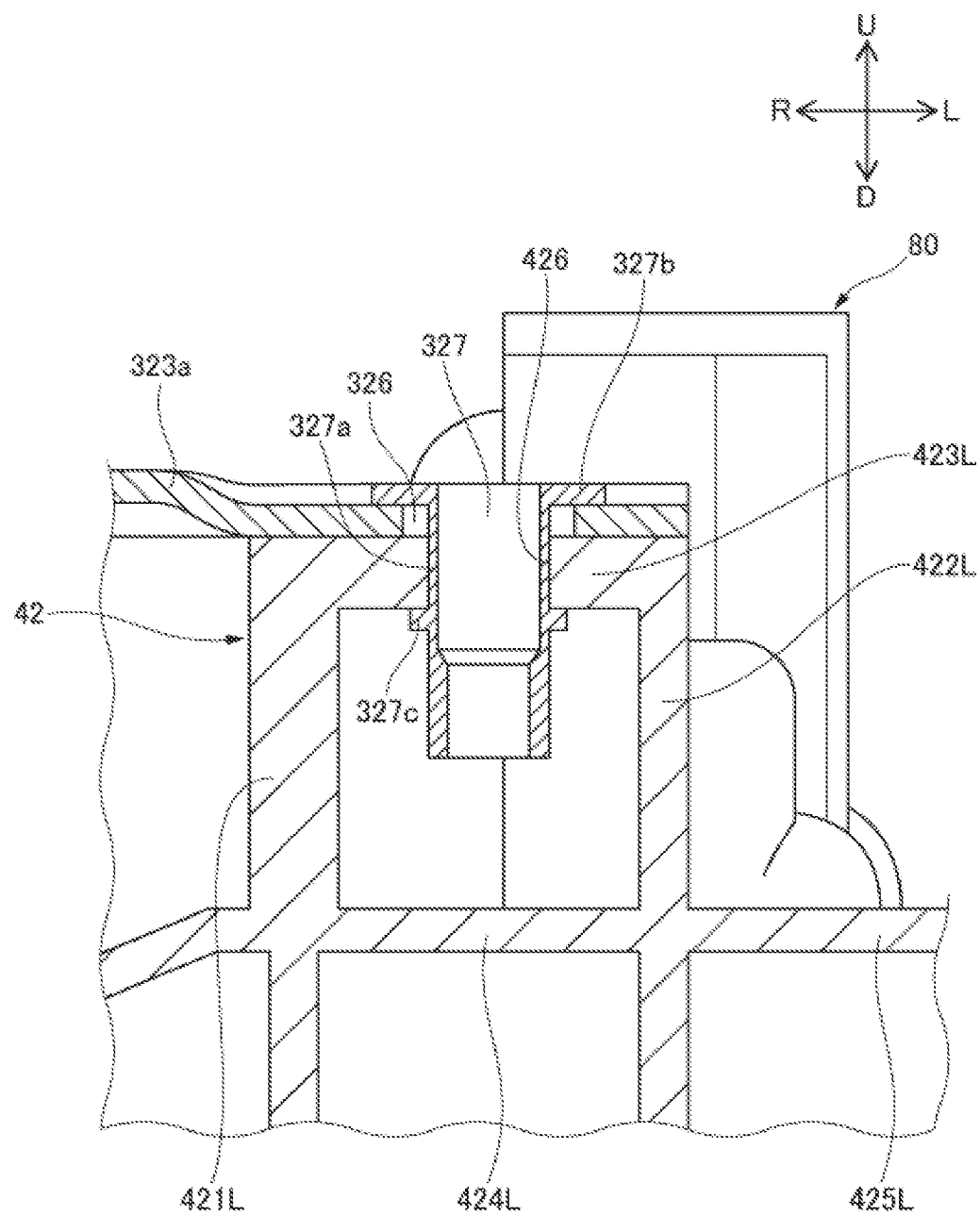
FIG. 9 is a sectional view taken along a line B-B of FIG. 7.

As illustrated in FIGS. 7 to 9, the left battery side frame 42L has a hollow portion having a substantially rectangular cross section as viewed from the front, and includes an inner wall surface 421L extending upward from a left end portion of the panel portion 41, an outer wall surface 422L facing the inner wall surface 421L at an outer side in the vehicle width direction and extending in the upper-lower direction, an upper surface 423L extending inward in the vehicle width direction from an upper end of the outer wall surface 422L to an upper end of the inner wall surface 421L, a bottom surface 424L facing the upper surface 423L at a lower side in the upper-lower direction and extending in the vehicle width direction from a lower end of the inner wall surface 421L to a lower end of the outer wall surface 422L, and a flange surface 425L extending outward in the vehicle width direction from a lower end of the outer wall surface 422L. Further, the left battery side frame 42L has a hollow portion which is surrounded by the inner wall surface 421L, the outer wall surface 422L, the upper surface 423L, and the bottom surface 424L as viewed from the front and has a substantially rectangular cross section. In addition, both the bottom surface 424L and the flange surface 425L extend in the vehicle width direction from the lower end of the outer wall surface 422L, and the bottom surface 424L and the flange surface 425L form a continuous horizontal surface with the outer wall surface 422L interposed therebetween.

The left battery side frame 42L is disposed such that the outer wall surface 422L and an outer end portion of the left flange portion 323a of the battery tray 32 in the vehicle width direction are substantially at the same position in the vehicle width direction. Further, the left flange portion 323a of the battery tray 32 abuts against the upper surface 423L of the left battery side frame 42L from above.

A plurality of insertion holes 326 penetrating in the upper-lower direction are provided in the left flange portion 323a of the battery tray 32. A plurality of insertion holes 426 (the same number as the insertion holes 326 provided in the left flange portion 323a of the battery tray 32) through which fixing pins 327 are inserted are formed on the upper surface 423L of the left battery side frame 42L.

The fixing pins 327 are inserted into the plurality of insertion holes 326 formed in the left flange portion 323a of the battery tray 32 and the insertion holes 426 formed in the upper surface 423L of the left battery side frame 42L. The fixing pin 327 includes a hollow cylindrical portion 327a in the upper-lower direction, an annular flange-shaped flange portion 327b formed at the upper end of the cylindrical portion 327a, and a claw portion 327c formed into a ring shape so as to protrude from the cylindrical portion 327a. Further, the cylindrical portion 327a of the fixing pin 327 is inserted through each of the plurality of insertion holes 326 provided in the left flange portion 323a of the battery tray 32 and the insertion hole 426 formed in the upper surface 423L of the left battery side frame 42L, the flange portion 327b abuts against the left flange portion 323a of the battery tray 32, and the claw portion 327c is locked to a lower side of the upper surface 423L of the left battery side frame 42L, whereby the battery tray 32 is fixed to the left battery side frame 42L on the upper surface 423L of the left battery side frame 42L. Accordingly, the battery unit case 31 is fixed to the left battery side frame 42L on the upper surface 423L of the left battery side frame 42L.

As described above, the battery unit case 31 is fixed to the left battery side frame 42L on the upper surface 423L located above the flange surface 425L and the outer wall surface 422L. Accordingly, in a case where the flange surface 425L or the outer wall surface 422L of the left battery side frame 42L is exposed to water, it is possible to prevent the water, which has come into contact with the flange surface 425L or the outer wall surface 422L of the left battery side frame 42L, from entering the inside of the battery unit case 31.

In the left battery side frame 42L, a plurality of cutout portions 427 in which the outer wall surface 422L and the upper surface 423L are cut out in a substantially arc shape as viewed from above from the outside in the vehicle width direction are provided along the front-rear direction. In the present embodiment, six cutout portions 427 are provided along the front-rear direction (see FIG. 4).

A collar member 80 is fixed to each of the cutout portions 427. Therefore, six collar members 80 are fixed to the left battery side frame 42L (see FIG. 4).

Figure 10:
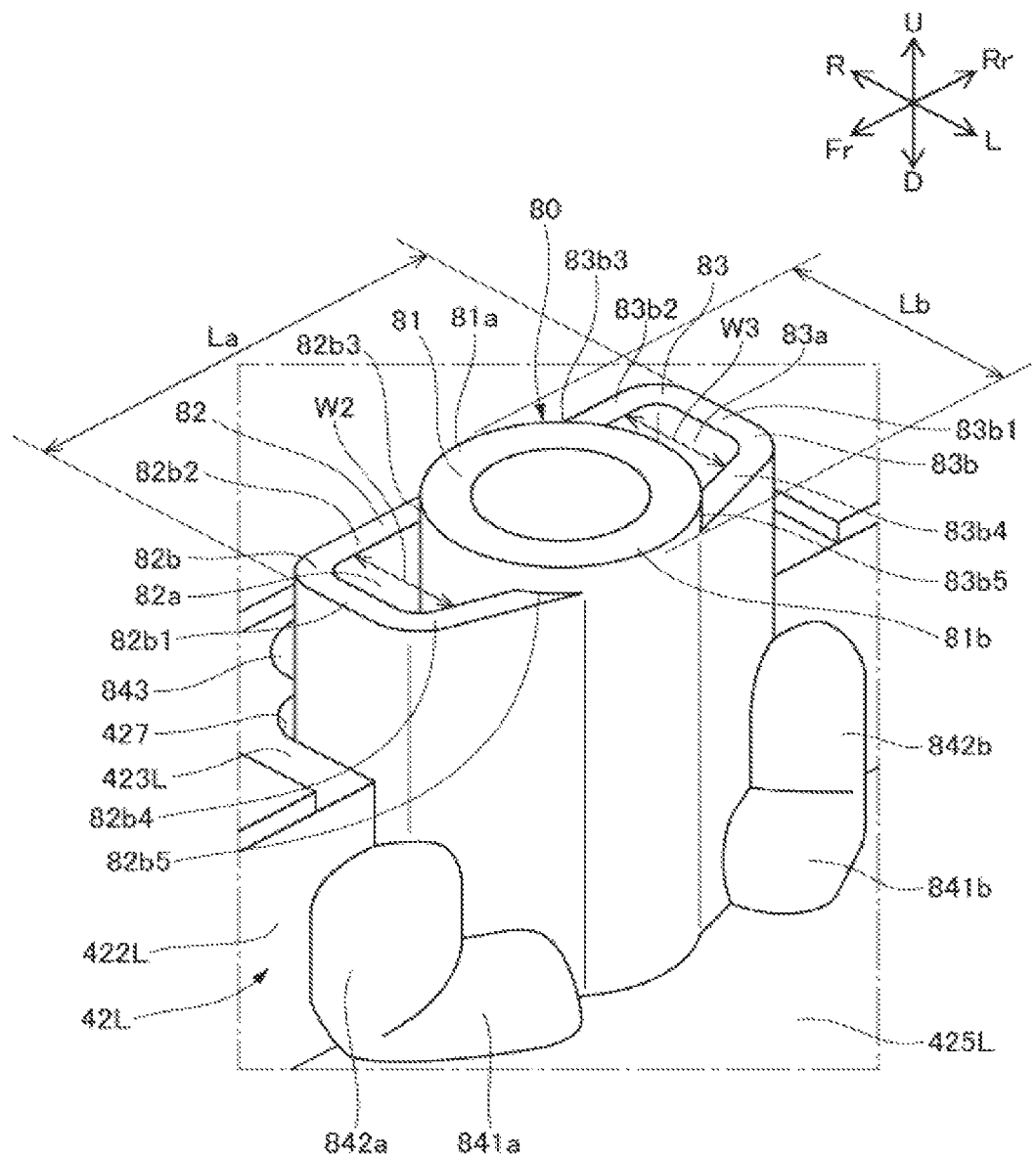
FIG. 10 is an enlarged view of a main part around a collar member of FIG. 4.
Figure 11:
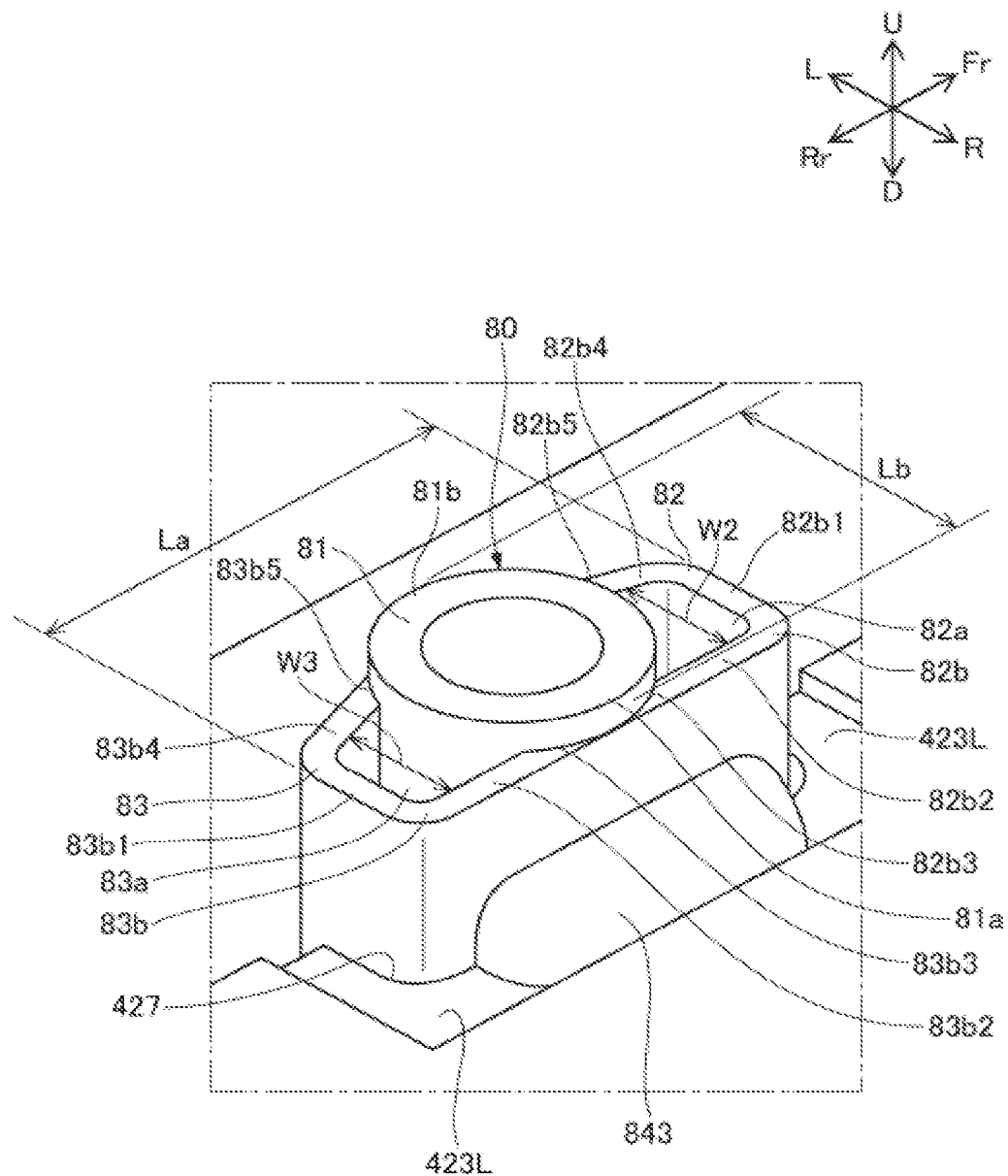
FIG. 11 is a perspective view of the collar member of FIG. 10, as viewed from an inner upper side in a vehicle width direction.

As illustrated in FIGS. 10 and 11, each collar member 80 includes a hollow cylindrical portion 81 extending in the upper-lower direction, a front adjacent portion 82 including a wall portion 82b which extends in the upper-lower direction, and is connected to the cylindrical portion 81 at both ends and curved and/or bent to extend so as to form a hollow front hollow portion 82a in the upper-lower direction in front of the cylindrical portion 81 as viewed from above, and a rear adjacent portion 83 including a wall portion 83b which extends in the upper-lower direction, and is connected to the cylindrical portion 81 at both ends and curved and/or bent to extend so as to form a hollow rear hollow portion 83a in the upper-lower direction behind the cylindrical portion 81 as viewed from above.

In this way, a length La of the collar member 80 in the front-rear direction can be increased by the front adjacent portion 82 provided in front of the cylindrical portion 81 and the rear adjacent portion 83 provided in the rear of the cylindrical portion 81. Further, since the front adjacent portion 82 has the hollow front hollow portion 82a in the upper-lower direction and the rear adjacent portion 83 has the hollow rear hollow portion 83a in the upper-lower direction, it is possible to increase the length La of the collar member 80 in the front-rear direction while suppressing an increase in the weight of the collar member 80.

The front hollow portion 82a of the front adjacent portion 82 is formed by a space surrounded by the cylindrical portion 81 and the wall portion 82b of the front adjacent portion 82. The wall portion 82b of the front adjacent portion 82 has a substantially U-shape which opens rearward as viewed from above, and both ends of the wall portion 82b are connected to the cylindrical portion 81. In the present embodiment, the wall portion 82b of the front adjacent portion 82 includes a front wall portion 82b1 which extends in the vehicle width direction in front of the cylindrical portion 81, an inner wall portion 82b2 which extends rearward from an inner end portion of the front wall portion 82b1 in the vehicle width direction, an inner connecting portion 82b3 which is a rear end of the inner wall portion 82b2 and is connected to the cylindrical portion 81, an outer wall portion 82b4 which extends rearward from an outer end portion of the front wall portion 82b1 in the vehicle width direction so as to face the inner wall portion 82b2, and an outer connecting portion 82b5 which is a rear end of the outer wall portion 82b4 and is connected to the cylindrical portion 81.

The front adjacent portion 82 is formed such that a width W2 of the front hollow portion 82a in the vehicle width direction increases toward the rear as viewed from above. In the present embodiment, the inner wall portion 82b2 extends substantially parallel to the front-rear direction, and the outer wall portion 82b4 extends in the front-rear direction while being inclined with respect to the front-rear direction so as to be located on the outer side in the vehicle width direction toward the rear.

Since the front adjacent portion 82 has such a shape, the rigidity of the front adjacent portion 82 is improved as compared with a case where the inner wall portion 82b2 and the outer wall portion 82b4 extend substantially in parallel with each other in the front-rear direction. Accordingly, the rigidity of the collar member 80 can be improved.

The rear hollow portion 83a of the rear adjacent portion 83 is formed by a space surrounded by the cylindrical portion 81 and the wall portion 83b of the rear adjacent portion 83. The wall portion 83b of the rear adjacent portion 83 has a substantially U-shape which opens forward as viewed from above, and both ends of the wall portion 83b are connected to the cylindrical portion 81. In the present embodiment, the wall portion 83b of the rear adjacent portion 83 includes a rear wall portion 83b1 which extends in the vehicle width direction behind the cylindrical portion 81, an inner wall portion 83b2 which extends forward from an inner end portion of the rear wall portion 83b1 in the vehicle width direction, an inner connecting portion 83b3 which is a front end of the inner wall portion 83b2 and is connected to the cylindrical portion 81, an outer wall portion 83b4 which extends rearward from an outer end portion of the rear wall portion 83b1 in the vehicle width direction so as to face the inner wall portion 83b2, and an outer connecting portion 83b5 which is a front end of the outer wall portion 83b4 and is connected to the cylindrical portion 81.

The rear adjacent portion 83 is formed such that a width W3 of the rear hollow portion 83a in the vehicle width direction increases toward the front as viewed from above. In the present embodiment, the inner wall portion 83b2 extends substantially parallel to the front-rear direction, and the outer wall portion 83b4 extends in the front-rear direction while being inclined with respect to the front-rear direction so as to be located on the outer side in the vehicle width direction toward the front.

Since the rear adjacent portion 83 has such a shape, the rigidity of the rear adjacent portion 83 is improved as compared with a case where the inner wall portion 83b2 and the outer wall portion 83b4 extend substantially in parallel with each other in the front-rear direction. Accordingly, the rigidity of the collar member 80 can be improved.

The inner wall portion 82b2 of the front adjacent portion 82 and the inner wall portion 83b2 of the rear adjacent portion 83 extend in the front-rear direction at substantially the same position as an inner end portion 81a of the cylindrical portion 81 in the vehicle width direction in the vehicle width direction. Further, the inner connecting portion 82b3 of the front adjacent portion 82 and the inner connecting portion 83b3 of the rear adjacent portion 83 are connected to the inner end portion 81a of the cylindrical portion 81 in the vehicle width direction.

The outer wall portion 82b4 of the front adjacent portion 82 and the outer wall portion 83b4 of the rear adjacent portion 83 extend in the front-rear direction on the inner side in the vehicle width direction than an outer end portion 81b of the cylindrical portion 81 in the vehicle width direction. Further, the outer connecting portion 82b5 of the front adjacent portion 82 and the outer connecting portion 83b5 of the rear adjacent portion 83 are positioned on the inner side in the vehicle width direction than the outer end portion 81b of the cylindrical portion 81 in the vehicle width direction. Therefore, the cylindrical portion 81 protrudes outward in the vehicle width direction from the front adjacent portion 82 and the rear adjacent portion 83.

The length La of the entire collar member 80 in the front-rear direction including the cylindrical portion 81, the front adjacent portion 82, and the rear adjacent portion 83 is longer than the length Lb of the entire collar member 80 in the vehicle width direction.

Each collar member 80 is placed at a position which straddles both the bottom surface 424L and the flange surface 425L of the left battery side frame 42L at the cutout portion 427 formed in the left battery side frame 42L (see FIG. 8). That is, each collar member 80 is placed on the bottom surface 424L and the flange surface 425L of the left battery side frame 42L such that the inner end portion 81a of the cylindrical portion 81 is on the bottom surface 424L of the left battery side frame 42L and the outer end portion 81b of the cylindrical portion 81 is on the flange surface 425L of the left battery side frame 42L.

A front first joining portion 841a which joins the collar member 80 and the flange surface 425L of the left battery side frame 42L is provided on the outer wall portion 82b4 of the front adjacent portion 82 of each collar member 80. The front first joining portion 841a extends in the front-rear direction along the outer wall portion 82b4 of the front adjacent portion 82. A front second joining portion 842a which joins the collar member 80 and the outer wall surface 422L of the left battery side frame 42L is provided on the outer wall portion 82b4 of the front adjacent portion 82 of each collar member 80. The front second joining portion 842a extends in the upper-lower direction along the outer wall surface 422L from the flange surface 425L of the left battery side frame 42L. In the present embodiment, a front end of the front first joining portion 841a and a lower end of the front second joining portion 842a are connected to each other, and a substantially L-shaped joining portion is formed by the front first joining portion 841a and the front second joining portion 842a.

A rear first joining portion 841b which joins the collar member 80 and the flange surface 425L of the left battery side frame 42L is provided on the outer wall portion 83b4 of the rear adjacent portion 83 of each collar member 80. The rear first joining portion 841b extends in the front-rear direction along the outer wall portion 83b4 of the rear adjacent portion 83. A rear second joining portion 842b which joins the collar member 80 and the outer wall surface 422L of the left battery side frame 42L is provided on the outer wall portion 83b4 of the rear adjacent portion 83 of each collar member 80. The rear second joining portion 842b extends in the upper-lower direction along the outer wall surface 422L from the flange surface 425L of the left battery side frame 42L. In the present embodiment, a rear end of the rear first joining portion 841b and a lower end of the rear second joining portion 842b are connected to each other, and a substantially L-shaped joining portion is formed by the rear first joining portion 841b and the rear second joining portion 842b.

A third joining portion 843 which joins the collar member 80 and the upper surface 423L of the left battery side frame 42L is provided on the inner wall portion 82b2 of the front adjacent portion 82 and the inner wall portion 83b2 of the rear adjacent portion 83 of each collar member 80. The third joining portion 843 extends continuously in the front-rear direction from the inner wall portion 82b2 of the front adjacent portion 82 to the inner wall portion 83b2 of the rear adjacent portion 83 via the inner end portion 81a of the cylindrical portion 81.

The front first joining portion 841a, the front second joining portion 842a, the rear first joining portion 841b, the rear second joining portion 842b, and the third joining portion 843 are formed of a welding material.

Each collar member 80 is placed on and temporarily fixed to the bottom surface 424L and the flange surface 425L of the left battery side frame 42L, and then the collar member 80 and the left battery side frame 42L are joined by welding by the front first joining portion 841a, the front second joining portion 842a, the rear first joining portion 841b, the rear second joining portion 842b, and the third joining portion 843, so that the collar member 80 is fixed to the left battery side frame 42L.

As described above, since each collar member 80 can be placed on and temporarily fixed to the bottom surface 424L and the flange surface 425L of the left battery side frame 42L, each collar member 80 can be easily temporarily fixed to the left battery side frame 42L. Further, the collar member 80 is joined to the flange surface 425L of the left battery side frame 42L by the front first joining portion 841a and the rear first joining portion 841b, is joined to the outer wall surface 422L of the left battery side frame 42L by the front second joining portion 842a and the rear second joining portion 842b, and is joined to the upper surface 423L of the left battery side frame 42L by the third joining portion 843. Therefore, the collar member 80 is joined to three different surfaces of the left battery side frame 42L by the front first joining portion 841a, the rear first joining portion 841b, the front second joining portion 842a, the rear second joining portion 842b, and the third joining portion 843. As a result, the collar member 80 can be firmly fixed to the left battery side frame 42L.

Since the front first joining portion 841a and the front second joining portion 842a are provided on the outer wall portion 82b4 of the front adjacent portion 82 positioned on the inner side in the vehicle width direction than the outer end portion 81b of the cylindrical portion 81, it is possible to reduce a portion where the front first joining portion 841a and the front second joining portion 842a formed by the welding material protrude outward from the outer end portion 81b of the cylindrical portion 81 in the vehicle width direction. Similarly, since the rear first joining portion 841b and the rear second joining portion 842b are provided on the outer wall portion 83b4 of the rear adjacent portion 83 positioned on the inner side in the vehicle width direction than the outer end portion 81b of the cylindrical portion 81, it is possible to reduce a portion where the rear first joining portion 841b and the rear second joining portion 842b formed by the welding material protrude outward from the outer end portion 81b of the cylindrical portion 81 in the vehicle width direction.

Since the outer wall portion 82b4 of the front adjacent portion 82 extends in the front-rear direction while being inclined with respect to the front-rear direction so as to be located on the outer side in the vehicle width direction toward the rear, it is possible to reduce a portion where the front first joining portion 841a extending in the front-rear direction along the outer wall portion 82b4 of the front adjacent portion 82 and the front second joining portion 842a extending in the upper-lower direction along the outer wall surface 422L from the flange surface 425L of the left battery side frame 42L protrude outward from the outer end portion 81b of the cylindrical portion 81. Similarly, since the outer wall portion 83b4 of the rear adjacent portion 83 extends in the front-rear direction while being inclined with respect to the front-rear direction so as to be located on the outer side in the vehicle width direction toward the front, it is possible to reduce a portion where the rear first joining portion 841b extending in the front-rear direction along the outer wall portion 83b4 of the rear adjacent portion 83 and the rear second joining portion 842b extending in the upper-lower direction along the outer wall surface 422L from the flange surface 425L of the left battery side frame 42L protrude outward from the outer end portion 81b of the cylindrical portion 81.

Figure 12:
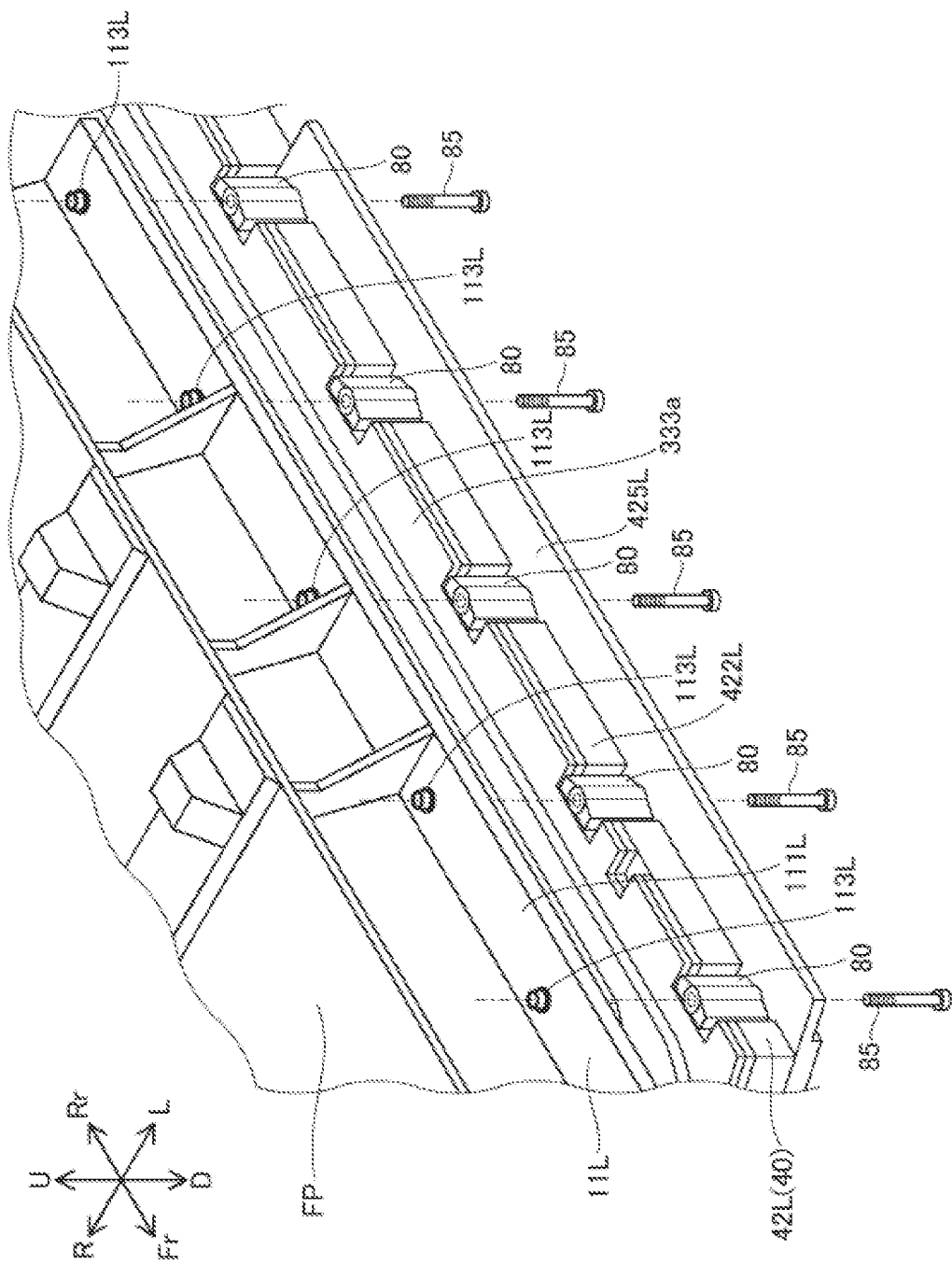
FIG. 12 is a perspective view of a main part of the drive battery unit of FIG. 3 and a periphery of a left side sill of the vehicle, as viewed obliquely from above.

As illustrated in FIGS. 12, 13A, and 13B, the left side sill 11L of the vehicle V is a hollow member extending in the front-rear direction. The left side sill 11L has a bottom surface 111L extending in the front-rear direction and the vehicle width direction. A plurality of insertion holes 112L penetrating in the upper-lower direction are formed in the bottom surface 111L of the left side sill 11L along the front-rear direction. A nut 113L is welded to each insertion hole 112L.

An insertion hole 428 penetrating in the upper-lower direction is formed in the bottom surface 424L and the flange surface 425L of the left battery side frame 42L at a position overlapping the cylindrical portion 81 of each collar member 80 as viewed from above.

The drive battery unit 20 is fixed to the vehicle V by a plurality of fastening bolts 85. The fastening bolt 85 is coaxially inserted from below into the insertion hole 428 of the left battery side frame 42L, the cylindrical portion 81 of the collar member 80, and the insertion hole 112L of the left side sill 11L, and the fastening bolt 85 is fastened to the nut 113L welded to the insertion hole 112L of the left side sill 11L, so that the drive battery unit 20 is fixed to the left side sill 11L, thereby being fixed to the vehicle V.

In this way, the collar member 80 is fixed to the left battery side frame 42L and the right battery side frame 42R, and the drive battery unit 20 is fixed to the vehicle V by inserting the fastening bolts 85 into the plurality of collar members 80, respectively.

In general, in a case where the drive battery unit is fixed to the vehicle by the plurality of fastening bolts, when the dimension of the drive battery unit in the front-rear direction is increased, the drive battery unit is easily deflected downward between the plurality of fastening bolts as viewed from a side, due to the own weight of the drive battery unit.

In the drive battery unit 20 of the present embodiment, the plurality of collar members 80 into which the fastening bolts 85 are inserted are fixed to the left battery side frame 42L and the right battery side frame 42R, and the drive battery unit 20 is fixed to the vehicle V by inserting the fastening bolts 85 into the collar members 80. Further, since the length La of the collar member 80 in the front-rear direction is longer than the length Lb of the collar member 80 in the vehicle width direction, the rigidity of the drive battery unit 20 with respect to the upper-lower direction is improved in the front-rear direction. As a result, the drive battery unit 20 disposed under the floor panel FP can be prevented from deflecting downward due to its own weight as viewed from a side.

Further, since the left battery side frame 42L and the right battery side frame 42R have a hollow portion having a substantially rectangular cross section as viewed from the front, the left battery side frame 42L and the right battery side frame 42R have high rigidity. Since the drive battery unit 20 is fixed to the vehicle V by inserting the fastening bolt 85 into the collar member 80, and the collar member 80 is fixed to the left battery side frame 42L and the right battery side frame 42R having high rigidity, it is possible to further prevent the drive battery unit 20 from deflecting downward due to its own weight.

Since the collar member 80 is fixed to the left battery side frame 42L and the right battery side frame 42R, the under panel 40 including the left battery side frame 42L and the right battery side frame 42R can be molded by extrusion molding along the front-rear direction, so that the left battery side frame 42L and the right battery side frame 42R having high rigidity can be easily molded.

Although the embodiment of the present disclosure have been described above, the present disclosure is not limited to the above embodiment, and modifications, improvements, or the like can be made as appropriate.

For example, although the front first joining portion 841a, the front second joining portion 842a, the rear first joining portion 841b, the rear second joining portion 842b, and the third joining portion 843 are formed of a welding material in the present embodiment, the front first joining portion 841a, the front second joining portion 842a, the rear first joining portion 841*b*, the rear second joining portion 842*b*, and the third joining portion 843 may be formed of an adhesive, and the collar member 80 may be fixed to the left battery side frame 42L and the right battery side frame 42R by adhesion.

At least the following matters are described in the present description. In the parentheses, the corresponding constituent elements and the like in the above-described embodiment are shown as an example, but the present invention is not limited thereto.

(1) A vehicle (vehicle V), includes:
a drive battery unit (drive battery unit 20) disposed under a floor panel (floor panel FP), in which:
the drive battery unit includes
a battery unit case (battery unit case 31) which accommodates a plurality of battery cells (battery cells 23),
a pair of left and right battery side frames (left battery side frame 42L, right battery side frame 42R) which extends in a front-rear direction of the vehicle, and
a plurality of fixing members (collar member 80) through which fastening members (fastening bolts 85) are inserted;
the drive battery unit is fixed to the vehicle by inserting the fastening members into the fixing members;
the battery unit case includes a left side wall (left side wall 313*a*) and a right side wall (right side wall 313*b*) which face each other in a vehicle width direction and extend in the front-rear direction;
one of the pair of left and right battery side frames is disposed on a left side of the left side wall of the battery unit case;
another of the pair of left and right battery side frames is disposed on a right side of the right side wall of the battery unit case; and
each of the fixing members is fixed to the pair of left and right battery side frames, and a length (length La) of each of the fixing members in the front-rear direction is longer than a length (length Lb) thereof in the vehicle width direction.

According to (1), since the drive battery unit is fixed to the vehicle by inserting the fastening members into the fixing members, each of the fixing members is fixed to the pair of left and right battery side frames, and the length of each of the fixing members in the front-rear direction is longer than the length thereof in the vehicle width direction, the rigidity of the drive battery unit with respect to an upper-lower direction is improved in the front-rear direction. As a result, the drive battery unit disposed under the floor panel can be prevented from deflecting downward due to its own weight as viewed from a side.

(2) The vehicle according to (1), in which:
each of the fixing members includes
a cylindrical portion (cylindrical portion 81) which is hollow in an upper-lower direction,
a front adjacent portion (front adjacent portion 82) including a wall portion (wall portion 82*b*) which extends in the upper-lower direction, and is connected to the cylindrical portion at both ends and curved and/or bent to extend so as to form a front hollow portion (front hollow portion 82*a*) in front of the cylindrical portion as viewed from above, the front follow portion being hollow in the upper-lower direction, and
a rear adjacent portion (rear adjacent portion 83) including a wall portion (wall portion 83*b*) which extends in the upper-lower direction, and is connected to the cylindrical portion at both ends and curved and/or bent to extend so as to form a rear hollow portion (rear hollow portion 83*a*) behind the cylindrical portion as viewed from above, the rear hollow portion being hollow in the upper-lower direction.

According to (2), the length of each of the fixing members in the front-rear direction can be increased by the front adjacent portion provided in front of the cylindrical portion and the rear adjacent portion provided behind the cylindrical portion. Further, since the front adjacent portion has a front hollow portion which is hollow in the upper-lower direction and the rear adjacent portion has a rear hollow portion which is hollow in the upper-lower direction, it is possible to increase the length of each of the fixing members in the front-rear direction while suppressing an increase in the weight of each of the fixing members.

(3) The vehicle according to (2), in which:
the cylindrical portion protrudes outward in the vehicle width direction from the front adjacent portion and the rear adjacent portion; and
at least one of the front adjacent portion and the rear adjacent portion is provided with a joining portion (front first joining portion 841*a*, rear first joining portion 841*b*, front second joining portion 842*a*, and rear second joining portion 842*b*) which joins each of the fixing members and the battery side frame.

According to (3), since at least one of the front adjacent portion and the rear adjacent portion positioned on an inner side in the vehicle width direction with respect to an outer end portion of the cylindrical portion is provided with the joining portion, it is possible to reduce a portion where the joining portion protrudes outward from the outer end portion of the cylindrical portion in the vehicle width direction.

(4) The vehicle according to (2) or (3), in which:
the front adjacent portion is formed such that a width (width W2) of the front hollow portion in the vehicle width direction increases toward a rear side as viewed from above; and
the rear adjacent portion is formed such that a width (width W3) of the rear hollow portion in the vehicle width direction increases toward a front side as viewed from above.

According to (4), since the front adjacent portion is formed such that the width of the front hollow portion in the vehicle width direction increases toward the rear side as viewed from above, and the rear adjacent portion is formed such that the width of the rear hollow portion in the vehicle width direction increases toward the front side as viewed from above, the rigidity of the front adjacent portion and the rear adjacent portion is improved. Accordingly, the rigidity of each of the fixing members can be improved.

(5) The vehicle according to any one of (1) to (4), in which:
the battery side frame includes a stepped surface (outer wall surface 422L) extending in the upper-lower direction, an upper surface (upper surface 423L) extending inward in the vehicle width direction from an upper end of the stepped surface, and a flange surface (flange surface 425L) extending outward in the vehicle width direction from a lower end of the stepped surface as viewed from the front, and
the battery unit case is fixed to the battery side frame on the upper surface of the battery side frame.

According to (5), since the battery unit case is fixed to the battery side frame on the upper surface positioned above the flange surface and the stepped surface, in a case where the flange surface or the stepped surface of the battery side frame is exposed to water, it is possible to prevent the water, which has come into contact with the flange surface or the stepped surface of the battery side frame, from entering the inside of the battery unit case.

(6) The vehicle according to (5), in which:

at least a part of each of the fixing members is placed on the flange surface of the battery side frame, and each of the fixing members is provided with a first joining portion (front first joining portion 841a, rear first joining portion 841b) which joins each of the fixing members and the flange surface of the battery side frame, a second joining portion (front second joining portion 842a, rear second joining portion 842b) which joins each of the fixing members and the stepped surface of the battery side frame, and a third joining portion (third joining portion 843) which joins each of the fixing members and the upper surface of the battery side frame.

According to (6), since each of the fixing members can be placed on and temporarily fixed to the flange surface of the battery side frame, each of the fixing members can be easily temporarily fixed to the battery side frame. Further, each of the fixing members is joined to the flange surface of the battery side frame by the first joining portion, is joined to the stepped surface of the battery side frame by the second joining portion, and is joined to the upper surface of the battery side frame by the third joining portion. Therefore, each of the fixing members is joined to three different surfaces of the battery side frame by the first joining portion, the second joining portion, and the third joining portion. Accordingly, each of the fixing members can be firmly fixed to the battery side frame.

What is claimed is:

1. A vehicle comprising:
a drive battery unit disposed under a floor panel, wherein:
the drive battery unit includes
a battery unit case which accommodates a plurality of battery cells,
a pair of left and right battery side frames which extends in a front-rear direction of the vehicle, and
a plurality of fixing members through which fastening members are inserted;
the drive battery unit is fixed to the vehicle by inserting the fastening members into the fixing members;
the battery unit case includes a left side wall and a right side wall which face each other in a vehicle width direction and extend in the front-rear direction;
one of the pair of left and right battery side frames is disposed on a left side of the left side wall of the battery unit case;
another of the pair of left and right battery side frames is disposed on a right side of the right side wall of the battery unit case;
each of the fixing members is fixed to the pair of left and right battery side frames, and a length of each of the fixing members in the front-rear direction is longer than a length thereof in the vehicle width direction; and
each of the fixing members includes
a cylindrical portion which is hollow in an upper-lower direction,
a front adjacent portion including a wall portion which extends in the upper-lower direction, and is connected to the cylindrical portion at both ends and curved or bent to extend so as to form a front hollow portion in front of the cylindrical portion as viewed from above, the front hollow portion being hollow in the upper-lower direction, and
a rear adjacent portion including a wall portion which extends in the upper-lower direction, and is connected to the cylindrical portion at both ends and curved or bent to extend so as to form a rear hollow portion behind the cylindrical portion as viewed from above, the rear hollow portion being hollow in the upper-lower direction.

2. The vehicle according to claim 1, wherein:
the cylindrical portion protrudes outward in the vehicle width direction from the front adjacent portion and the rear adjacent portion; and
at least one of the front adjacent portion and the rear adjacent portion is provided with a joining portion which joins each of the fixing members and a respective one of the left and right battery side frames.

3. The vehicle according to claim 1, wherein:
the front adjacent portion is formed such that a width of the front hollow portion in the vehicle width direction increases toward a rear side as viewed from above; and
the rear adjacent portion is formed such that a width of the rear hollow portion in the vehicle width direction increases toward a front side as viewed from above.

4. The vehicle according to claim 1, wherein:
the left and right battery side frames each includes a stepped surface extending in the upper-lower direction, an upper surface extending inward in the vehicle width direction from an upper end of the stepped surface, and a flange surface extending outward in the vehicle width direction from a lower end of the stepped surface as viewed from the front; and
the battery unit case is fixed to the upper surfaces of the left and right battery side frames.

5. The vehicle according to claim 4, wherein:
at least a part of each of the fixing members is placed on the flange surface of a respective one of the left and right battery side frames; and
each of the fixing members is provided with a first joining portion which joins each of the fixing members and the flange surface of a respective one of the left and right battery side frames, a second joining portion which joins the each of the fixing members and the stepped surface of a respective one of the left and right battery side frames, and a third joining portion which joins each of the fixing members and the upper surface of a respective one of the left and right side frames.

* * * * *